(12) United States Patent
Kwon et al.

(10) Patent No.: US 8,004,630 B2
(45) Date of Patent: *Aug. 23, 2011

(54) LIQUID CRYSTAL DISPLAY APPARATUS

(75) Inventors: Yoon-Soo Kwon, Suwon-si (KR); Sang-Soo Kim, Seoul (KR); Jin-Ho Ha, Suwon-si (KR); Hyun-Chul Bae, Seoul (KR); Ick-Hwan Lee, Suwon-si (KR); Sang-Duk Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/478,371

(22) Filed: Jun. 4, 2009

(65) Prior Publication Data

US 2009/0237590 A1    Sep. 24, 2009

Related U.S. Application Data

(63) Continuation of application No. 11/928,721, filed on Oct. 30, 2007, now Pat. No. 7,583,330, which is a continuation of application No. 10/385,188, filed on Mar. 10, 2003, now Pat. No. 7,298,432.

(30) Foreign Application Priority Data

May 24, 2002    (KR) .............................. 20020028992

(51) Int. Cl.
  *G02F 1/1333*    (2006.01)
  *G02F 1/1335*    (2006.01)

(52) U.S. Cl. ................. 349/58; 349/61; 349/62

(58) Field of Classification Search .................... 349/58, 349/61, 62

See application file for complete search history.

(56) References Cited

U.S. PATENT DOCUMENTS

| | | | |
|---|---|---|---|
| 5,835,139 A | 11/1998 | Yun et al. | |
| 6,064,455 A | 5/2000 | Kim | |
| 6,147,724 A | 11/2000 | Yoshii et al. | |
| 6,166,788 A | 12/2000 | Ha et al. | |
| 6,231,202 B1 | 5/2001 | Kozaka et al. | |
| 6,388,722 B1 | 5/2002 | Yoshii et al. | |
| 6,392,724 B2 * | 5/2002 | An et al. | 349/58 |
| 6,430,039 B2 | 8/2002 | Nakajima et al. | |
| 6,466,283 B1 | 10/2002 | Peng | |
| 6,690,435 B1 | 2/2004 | Ha et al. | |
| 2001/0050731 A1 | 12/2001 | An et al. | |
| 2002/0080298 A1 | 6/2002 | Fukayama | |

FOREIGN PATENT DOCUMENTS

| | | |
|---|---|---|
| JP | 20010134848 | 1/2001 |
| JP | 2001-330817 A | 11/2001 |
| JP | 2002040424 A | 2/2002 |
| KR | 1020010065164 A | 7/2001 |

* cited by examiner

*Primary Examiner* — Michael H Caley
(74) *Attorney, Agent, or Firm* — Cantor Colburn LLP

(57) ABSTRACT

Disclosed is an LCD apparatus including a receiving container for receiving a light guide plate and a lamp assembly, a first chassis for fixing the light guide plate and an LCD panel, and a second chassis for fixing the first chassis and the LCD panel. The receiving container and the first and second chassis are made of metal material so that the LCD apparatus may have reduced size and weight.

8 Claims, 24 Drawing Sheets

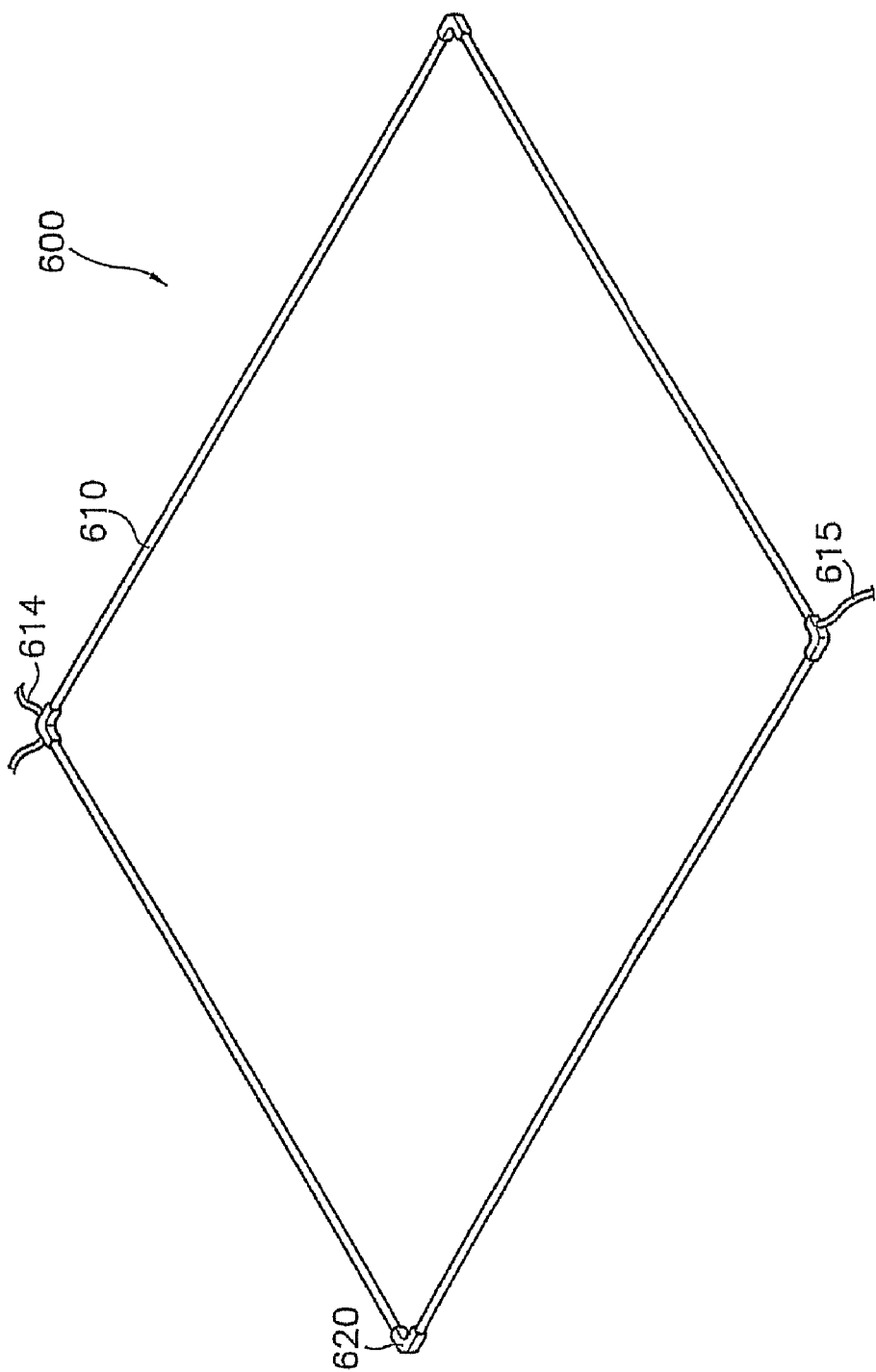

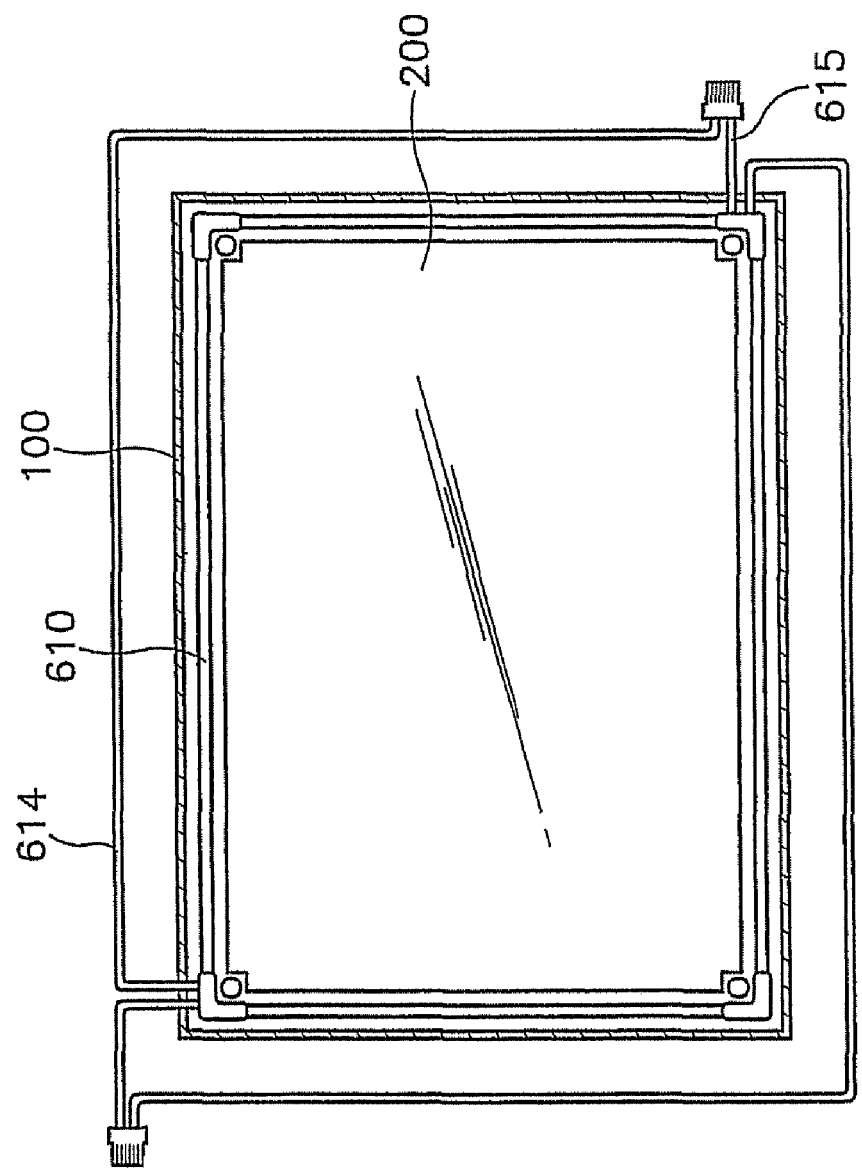

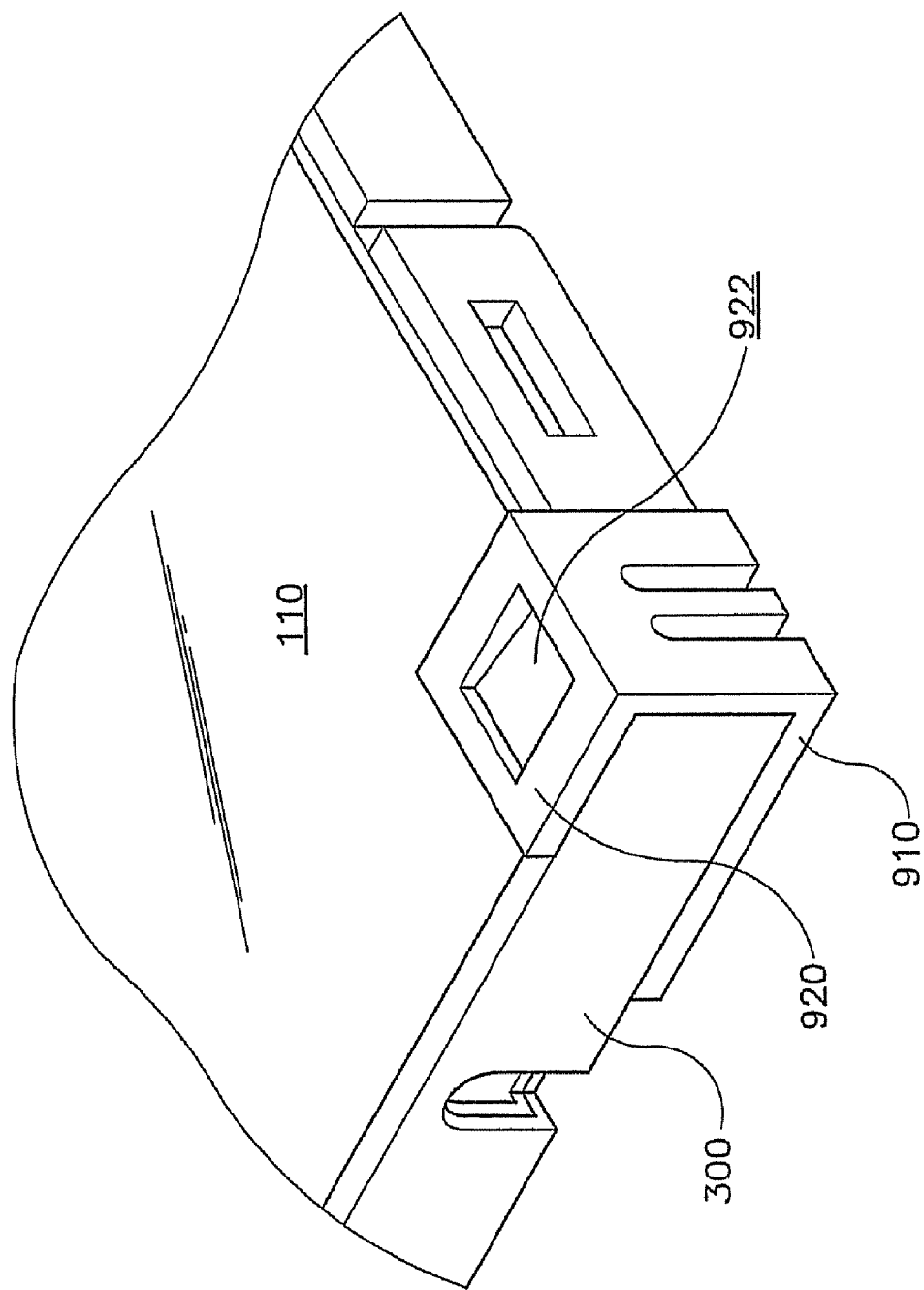

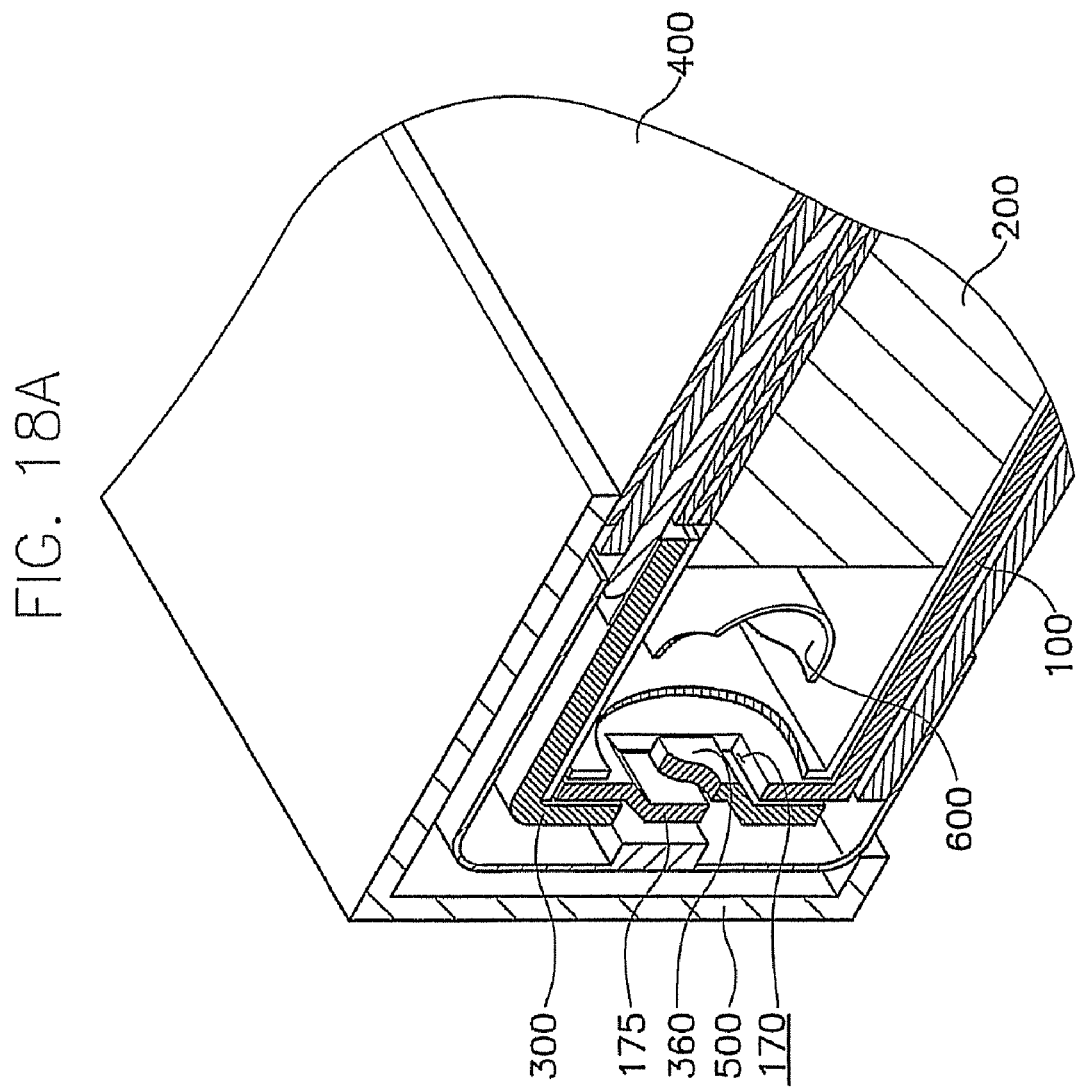

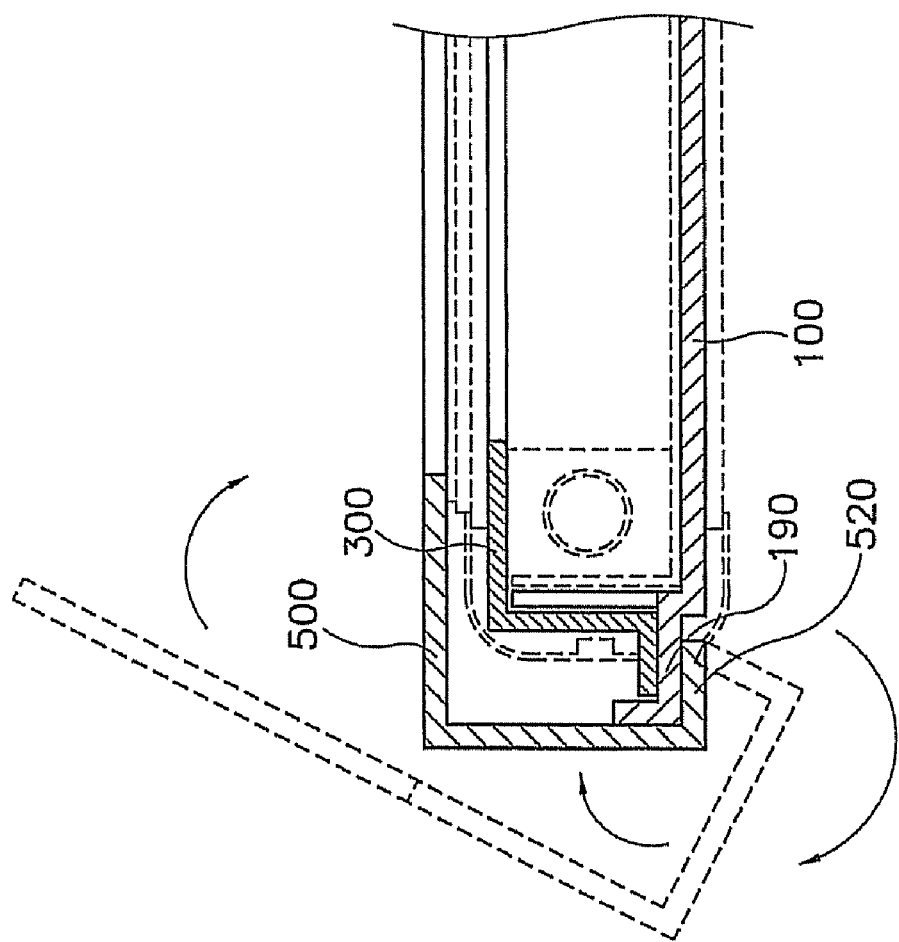

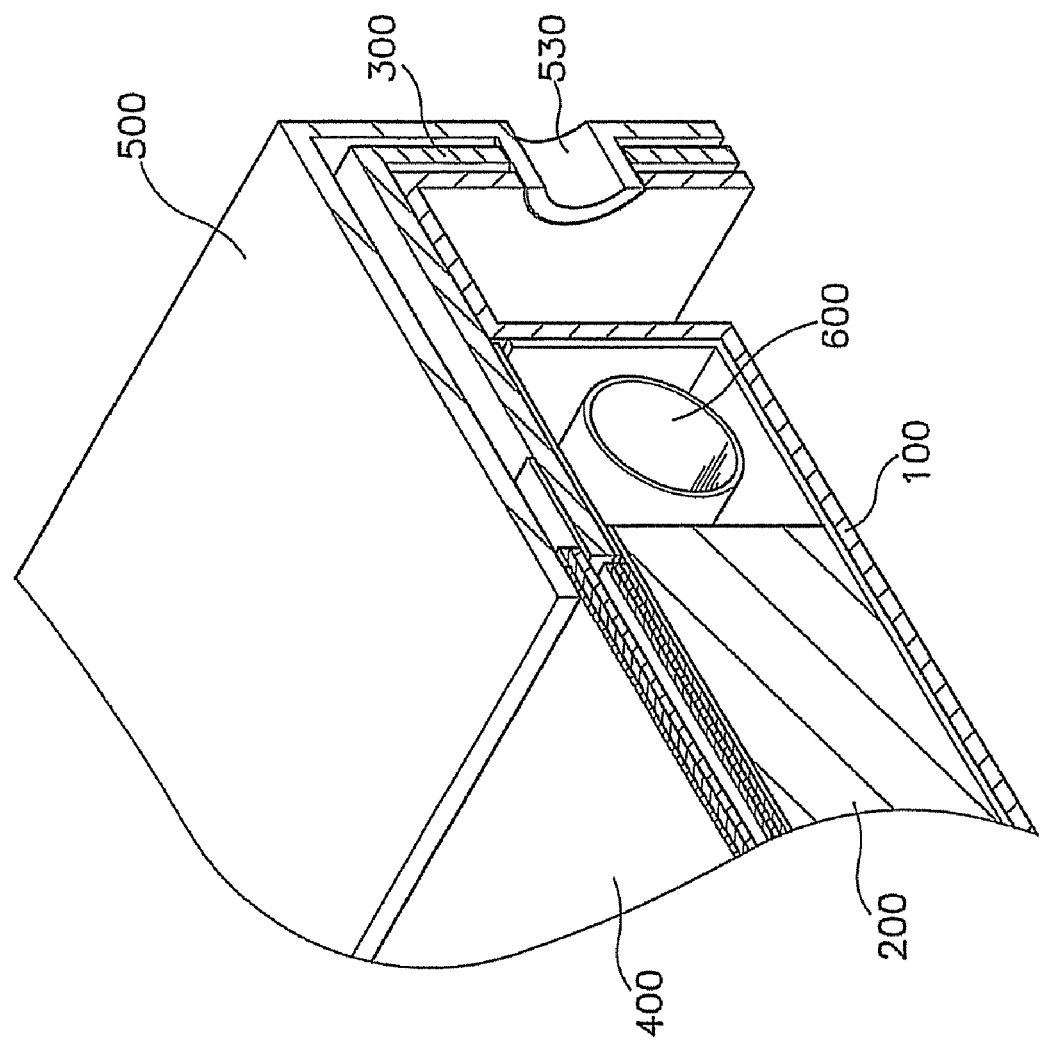

LIQUID CRYSTAL DISPLAY APPARATUS

CROSS REFERENCE TO RELATED APPLICATIONS

This application is a continuation application of U.S. application Ser. No. 11/928,721 filed Oct. 30, 2007, which is a continuation of U.S. application Ser. No. 10/385,188 filed Mar. 10, 2003 and issued as U.S. Pat. No. 7,298,432 on Nov. 20, 2007, which claims priority to and the benefit of Korean Patent Application No. 2002-0028992 filed on May 24, 2002, all of which are incorporated by reference herein in their entirety

BACKGROUND OF THE INVENTION

1. Field of the Invention

The present invention relates to an LCD (Liquid Crystal Display) apparatus, and more particularly to an LCD apparatus having metal chassis to reduce the size and weight of the LCD apparatus.

2. Description of the Related Art

An LCD apparatus, in general, is a display apparatus for displaying images using liquid crystal. The LCD apparatus has advantages such as lighter weight and smaller size in comparison with a CRT (Cathode Ray Tube) display apparatus.

The LCD apparatus is generally divided into a liquid crystal controlling part for controlling the liquid crystal and a light supplying part for supplying light to the liquid crystal.

The liquid crystal controlling part includes an LCD panel for displaying images and a driving module for driving the LCD panel. The LCD panel includes a TFT (Thin Film Transistor) substrate, liquid crystal and a color filter substrate. The TFT substrate is a transparent glass substrate on which TFTs are disposed in association with a voltage providing line and a first electrode. Each of the TFTs includes a gate electrode, a channel layer, a source electrode and a drain electrode. The first electrode is made of ITO (Indium Tin Oxide) or IZO (Indium Zinc Oxide) and disposed corresponding to each of drain electrodes of the TFTs. The voltage providing line includes gate lines and data lines to provide a driving signal to the TFTs. The gate lines are disposed corresponding to columns of the TFTs, and each of the gate lines provides a gate turn-on signal to the TFTs arranged in a column direction. The data lines are disposed corresponding to rows of the TFTs, and each of the data lines provides a data signal to the TFTs arranged in a row direction. The driving module receives an image signal generated from an external information-processing device and generates the driving signal to timely apply the driving signal to the gate and data lines. The color filter substrate combined to the TFT substrate includes a transparent substrate, a color filter and a second electrode. The color filter includes a red color filter, a green color filter and a blue color filter disposed on the transparent substrate in a matrix configuration. The second electrode made of the ITO or IZO is disposed over the transparent substrate to cover the color filter. The second electrode receives a predetermined reference voltage, so that an electric field is applied between the first and second electrodes. The liquid crystal is interposed between the color filter substrate and TFT substrate.

The light supplying part includes a middle receiving container, a bottom receiving container, a light guide plate, a lamp assembly and an optical sheet. The lamp assembly employs a CCFL (Cold Cathode Fluorescent Lamp) for generation the light. The light guide plate receives the light from the lamp and changes optical properties and light path of the light. The bottom receiving container provides a receiving space in which the lamp assembly and light guide plate are received. The optical sheet is disposed on the light guide plate and controls brightness distribution of the light emitted from the light guide plate. The middle receiving container is combined to the bottom receiving container to fix the LCD panel to the bottom receiving container. The LCD panel is fixed to the middle receiving container by a top chassis combined to the middle and bottom receiving containers.

Generally, the bottom and middle receiving containers are made of synthetic resin using an injection-molding manner. In order to form the bottom and middle receiving containers using the injection-molding manner, the bottom and middle receiving containers need a thickness of at least 0.4 mm. The bottom and middle receiving containers, generally, have a thickness of 0.4 mm at a first portion, where little strength is needed and a thickness of 1.2 mm to 1.5 mm at a second portion where certain strength is necessary. Also, the bottom and middle receiving containers are contracted at the time of cooling melted synthetic resin, and the first and second portions of the bottom and middle receiving containers each have a different contractile rate. As a result, the bottom and middle receiving containers are easily distorted in a manufacturing process.

Further, the bottom and middle receiving containers made of the synthetic resin have low heat conductivity, so that it is difficult to control a light transmittance of the liquid crystal because the liquid crystal is liquidized by heat emitted from the lamp assembly.

BRIEF SUMMARY OF THE INVENTION

The present invention provides an LCD apparatus having a reduced size and weight.

In one aspect of the invention, there is provided an LCD apparatus comprising: a receiving container having a bottom surface and a sidewall extended from the bottom surface to provide a receiving space; a light guide plate having a side surface corresponding to the sidewall, a light reflecting surface facing to the bottom surface, and a light emitting surface opposite to the light reflecting surface; a first chassis outwardly combined to the sidewall of the receiving container while pressing an edge portion of the light emitting surface; an LCD panel assembly disposed on the first chassis, which is facing to the light emitting surface; and a second chassis outwardly combined to the sidewall of the receiving container while pressing an edge portion of the LCD panel assembly.

According to the LCD apparatus, the receiving container for receiving the light guide plate and lamp assembly, the first chassis for fixing the light guide plate and LCD panel, and the second chassis for fixing the first chassis and LCD panel, are made of metal material. Thus, the LCD apparatus may have a reduced size and weight and may emit heat generated from the lamp assembly.

BRIEF DESCRIPTION OF THE DRAWINGS

The above and other advantages of the present invention will become readily apparent by reference to the following detailed description when considered in conjunction with the accompanying drawings wherein:

FIG. 8A is a perspective view showing a structure of a lamp shown in FIG. 1;

FIG. 8B is a schematic view showing the lamp assembled with the receiving container shown in FIG. 1;

FIG. 17 is a schematic view showing an assembled structure of the guide member and the receiving container;

FIGS. 18A and 18B are schematic views showing an assembled structure of the receiving container and the first chassis;

FIGS. 19 and 20 are schematic views showing an assembled structure of the receiving container and the second chassis; and FIG. 21 is a schematic view showing an assembled structure of a receiving container, a first chassis and a second chassis according to another embodiment of the present invention.

DETAILED DESCRIPTION OF THE INVENTION

Figure 1:
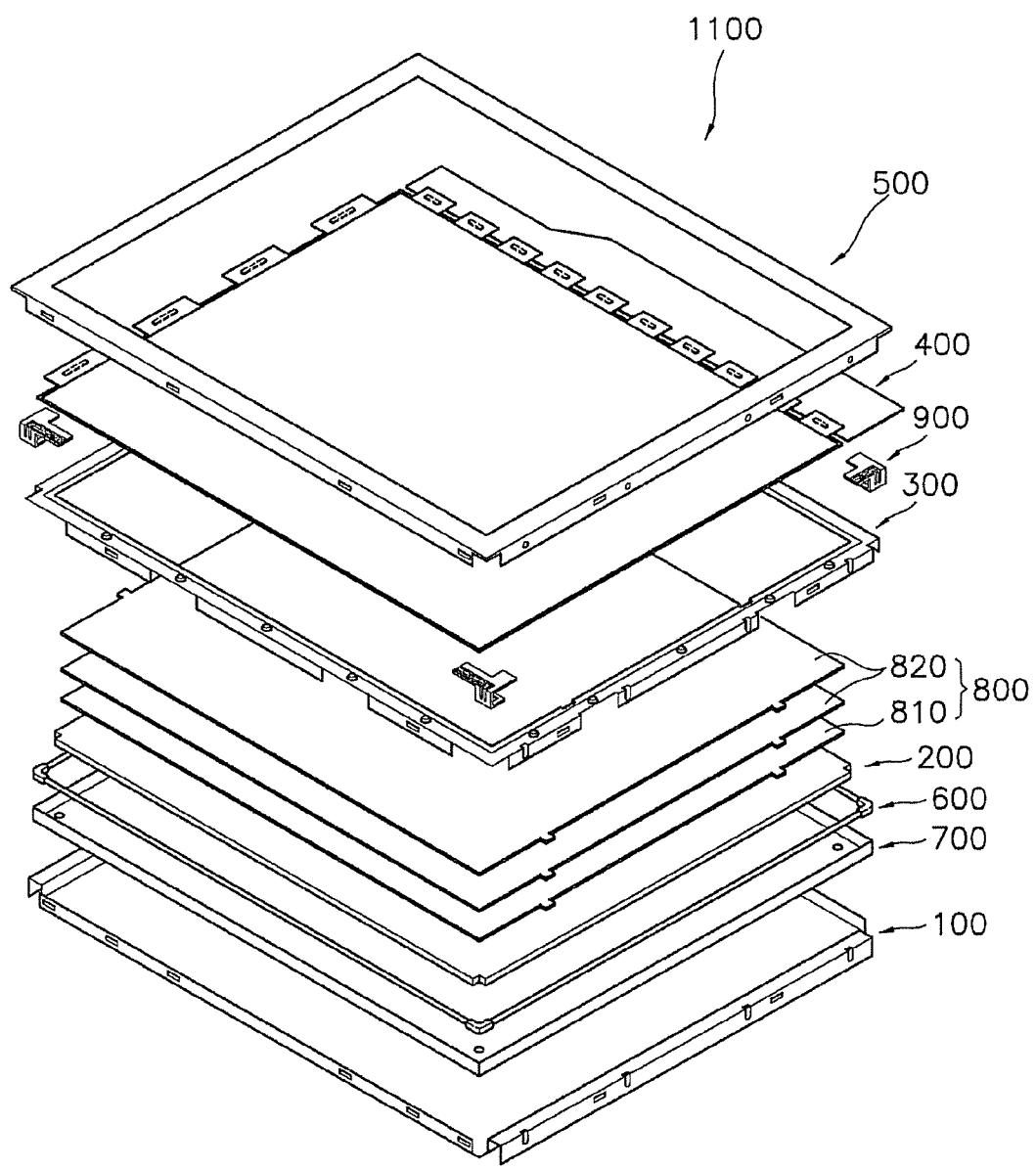
FIG. 1 is an exploded perspective view showing an LCD apparatus according to the present invention.

FIG. 1 is an exploded perspective view showing an LCD apparatus according to the present invention.

Referring to FIG. 1, the LCD apparatus 1100 includes a receiving container 100, a light guide plate 200, a first chassis 300, an LCD panel assembly 400 and a second chassis 500.

Figure 2:
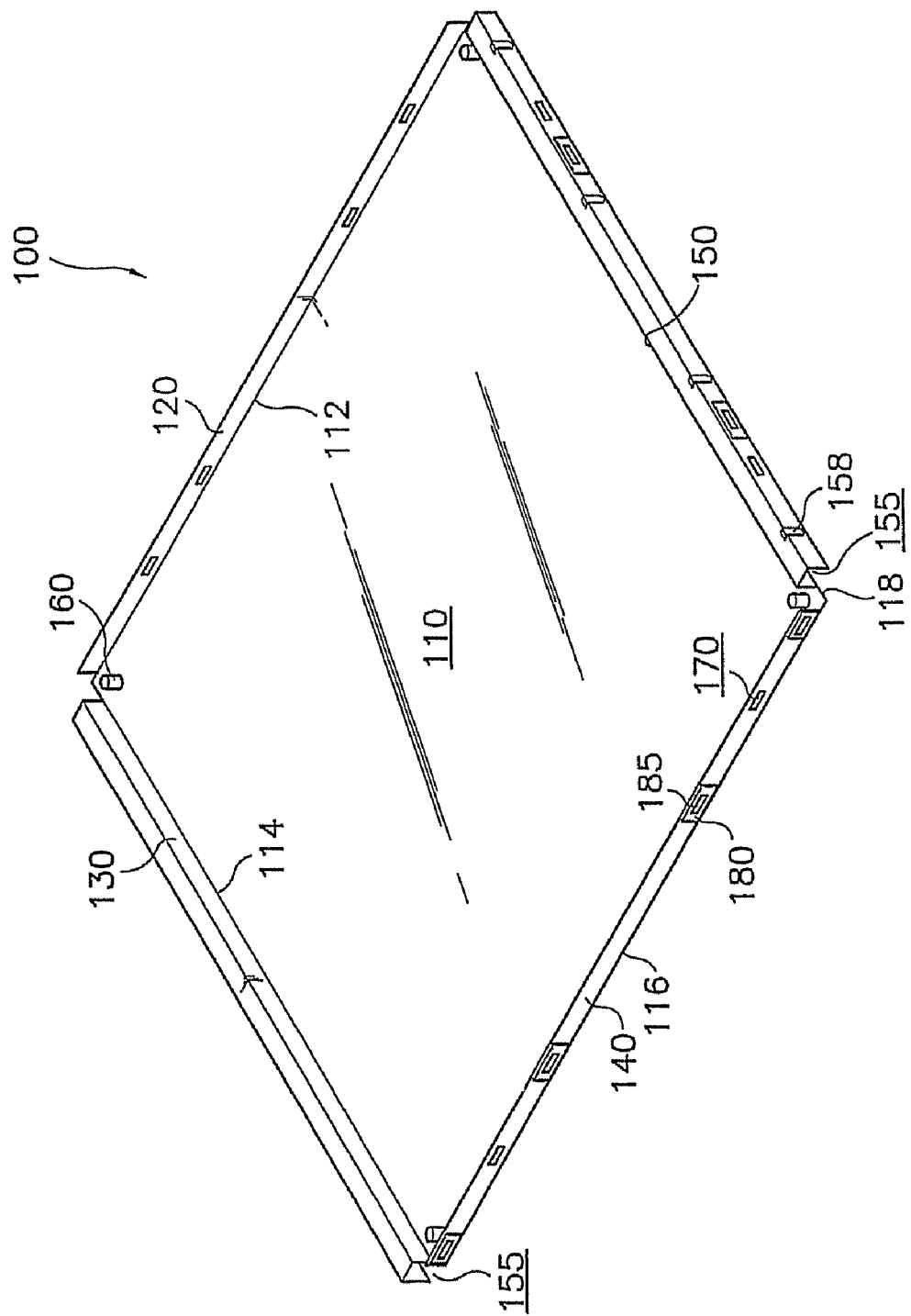
FIG. 2 is a perspective view showing a structure of a receiving container shown in FIG. 1.

FIG. 2 is a perspective view showing a structure of the receiving container shown in FIG. 1.

Referring to FIG. 2, the receiving container 100 includes a bottom surface 110 and first to fourth sidewalls 120, 130, 140 and 150. The bottom surface 110 has a rectangular shape and first to fourth edges 112, 114, 116 and 118. The first to fourth sidewalls 120, 130, 140 and 150 are extended from the first to fourth edges 112, 114, 116 and 118 in a same direction to have a same height, respectively. Accordingly, the receiving container 100 provides a receiving space formed with the bottom surface 110 and the first to fourth sidewalls 120, 130, 140, 150.

Figure 3:
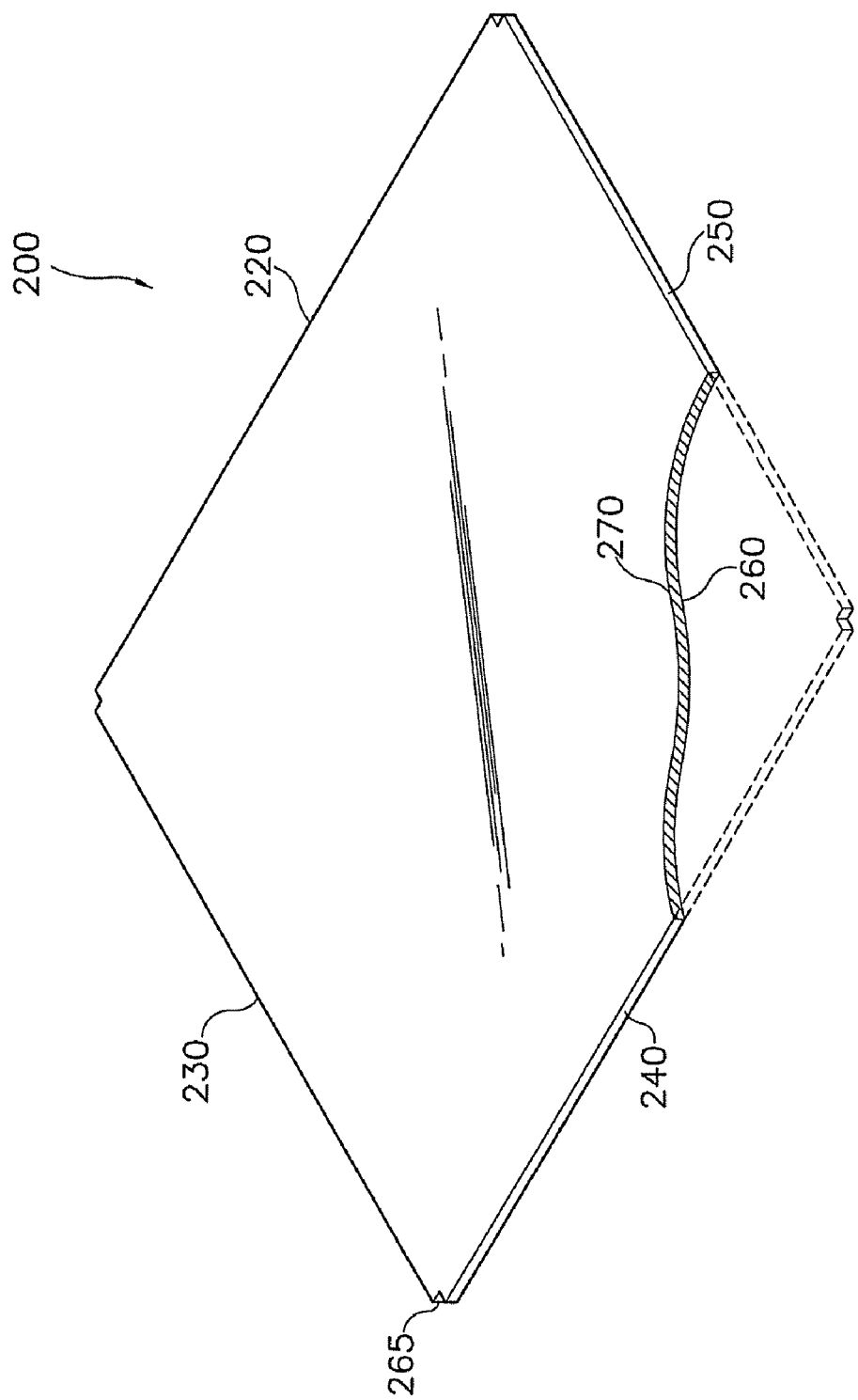
FIG. 3 is a perspective view showing a structure of a light guide plate shown in FIG. 1.

FIG. 3 is a perspective view showing a structure of the light guide plate shown in FIG. 1.

Referring to FIG. 3, the light guide plate 200 includes a light reflecting surface 260, a light emitting surface 270 and first to fourth side surfaces 220, 230, 240 and 250. The first to fourth side surface 220, 230, 240 and 250 are disposed to face to and apart from the first to fourth sidewalls 120, 130, 140 and 150 (referring to FIG. 2), respectively. The light reflecting surface 260 is connected with the first, second, third and fourth side surfaces 220, 230, 240 and 250 and faces to the bottom surface 110 of the receiving container 100 (referring to FIG. 2). The light reflecting surface 260 changes optical properties and light paths of light input through the first to fourth side surfaces 220, 230, 240 and 250. The light emitting surface 270 is also connected with the first, second, third and fourth side surfaces 220, 230, 240 and 250 and faces to the light reflecting surface 260. The light emitting surface 270 provides the light reflected from the light reflecting surface 260 to the LCD panel assembly 400.

Figure 4:
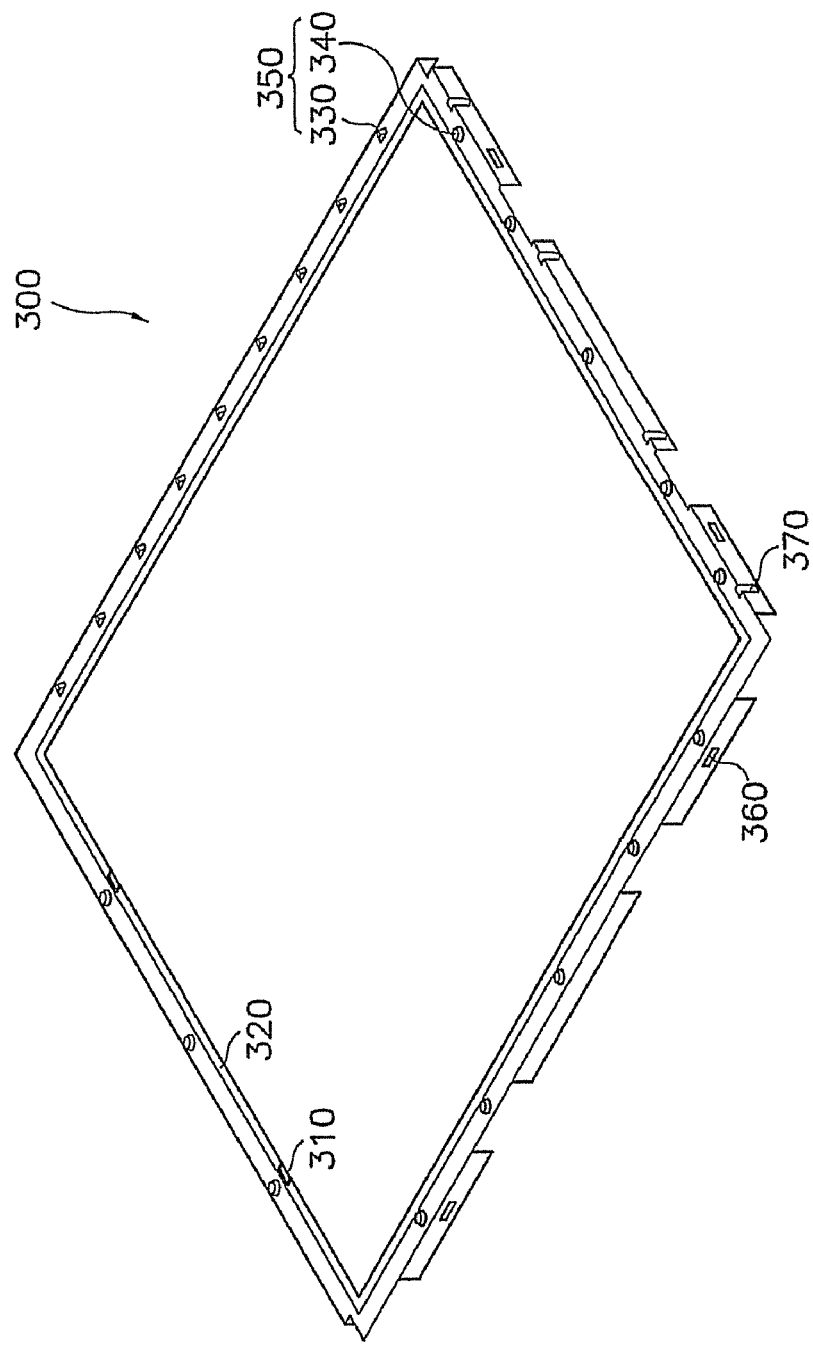
FIG. 4 is a perspective view showing a structure of a first chassis shown in FIG. 1.

FIG. 4 is a perspective view showing a structure of the first chassis shown in FIG. 1.

Referring to FIGS. 1 and 4, the first chassis 300 is disposed to prevent the light guide plate 200 from being deviated from the receiving container 100 by pressing edge portions of the light guide plate 200. The first chassis 300 is combined to the first to fourth sidewalls 120, 130, 140 and 150 (referring to FIG. 2) of the receiving container 100.

Figure 5:
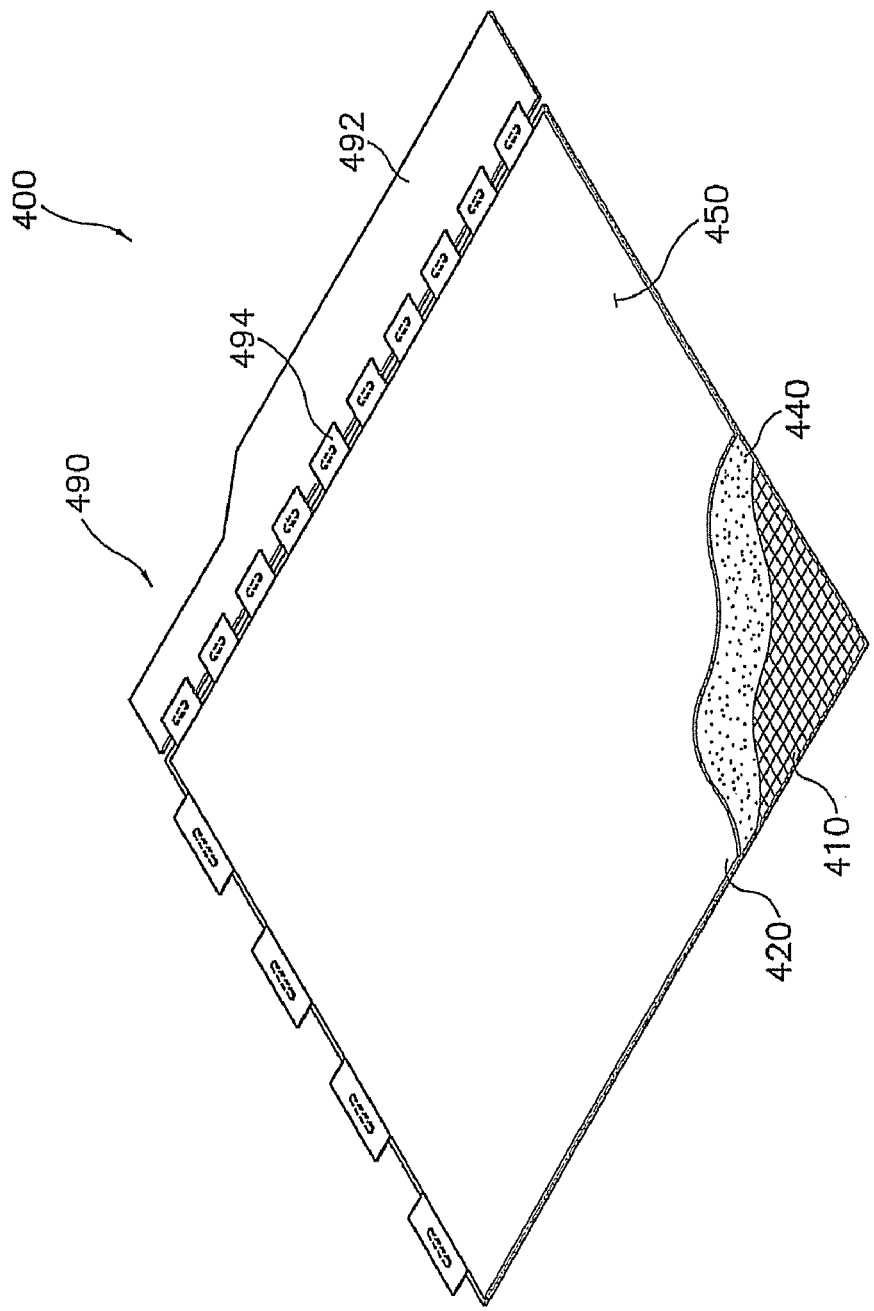
FIG. 5 is a perspective view showing a structure of an LCD panel assembly shown in FIG. 1.

FIG. 5 is a perspective view showing a structure of the LCD panel assembly shown in FIG. 1.

Referring to FIG. 5, the LCD panel assembly 400 is received on the first chassis 300 and faces to the light emitting surface 270 of the light guide plate 200 (referring to FIG. 3). The LCD panel assembly 400 includes an LCD panel 450 and a driving module 490. The LCD panel 450 includes a TFT substrate 410, a liquid crystal 440 and a color filter substrate 420.

Figure 6:
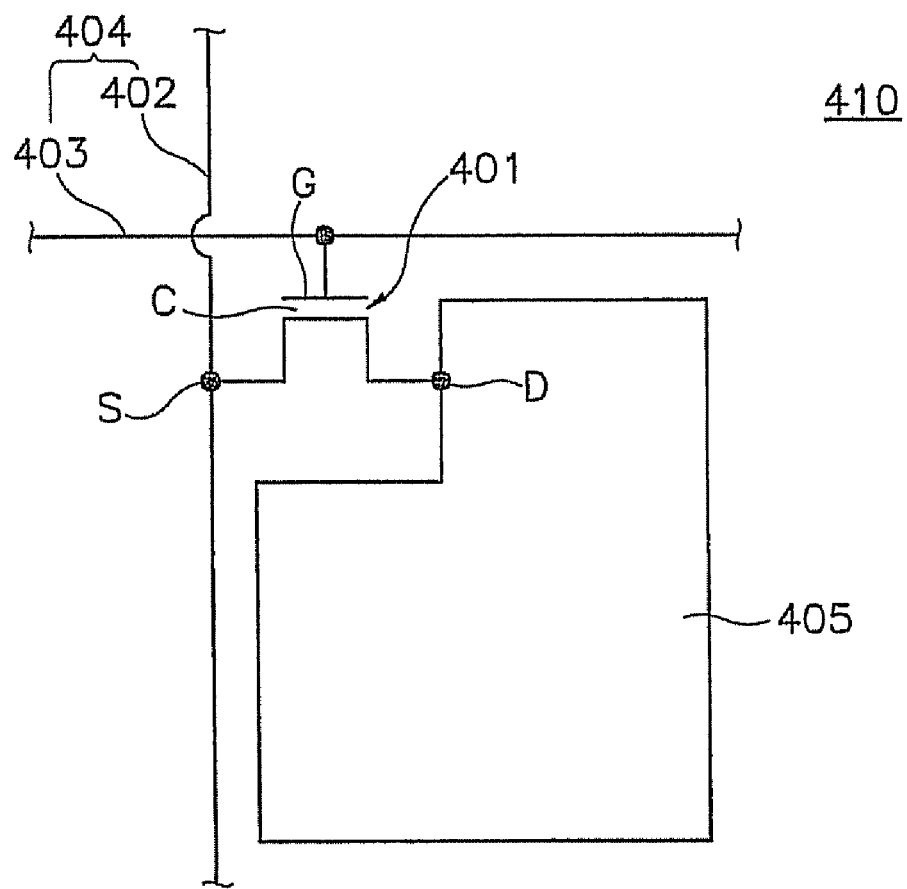
FIG. 6 is a partially enlarged view of a TFT substrate of the LCD panel according to the present invention.

FIG. 6 is a partially enlarged view of the TFT substrate of the LCD panel according to the present invention.

Referring to FIG. 6, the TFT substrate 410 is a transparent glass substrate on which TFTs 401 each associated with a voltage providing line 404 and a first electrode 405 are disposed in a matrix configuration. A TFT 401 includes a gate electrode "G", a channel layer "C", a source electrode "S" and a drain electrode "D". The first electrode 405 is made of, for example, ITO (indium tin oxide) or IZO (indium zinc oxide) and disposed to be connected with the drain electrode "D" of the TFT 401. The voltage providing line 404 includes a gate line 403 and a data line 402 to provide a driving signal to the TFT 401. The gate lines 403 are disposed in a column direction corresponding to the columns of the matrix configuration of the TFTs 401. A gate line 403 provides a gate turn-on signal to the TFTs 401 arranged in a column corresponding to the gate line 403. The data lines 402 are disposed in a row direction corresponding to the rows of the matrix configuration of the TFTs 401. A data line 402 provides a data signal to the TFTs 401 arranged in a row corresponding to the data line 402.

Referring to FIG. 5 again, the driving module 490 includes a PCB (Printed Circuit Board) 492 and a TCP (Tape Carrier Package) 494. The TCP 494 is connected to the gate and data lines 403 and 402 (referring to FIG. 6) and the PCB 492 is connected to the TCP 494. The driving module 490 receives an image signal generated from an external information-processing device and generates the driving signal to timely apply the driving signal to the gate and data lines 403 and 402.

The color filter substrate 420 combined to the TFT substrate 410 includes color filters (not shown) and a second electrode (not shown) disposed on a transparent substrate. The color filters each include a red color filter, a green color filter and a blue color filter and are disposed on the transparent substrate in a matrix configuration. The second electrode is disposed over the transparent substrate to cover the color filters. The second electrode receives a predetermined reference voltage, so that an electric field is applied between the first electrode 405 (referring to FIG. 6) and the second electrode (not shown). The liquid crystal 440 is interposed between the color filter substrate 420 and the TFT substrate 410.

Figure 7:
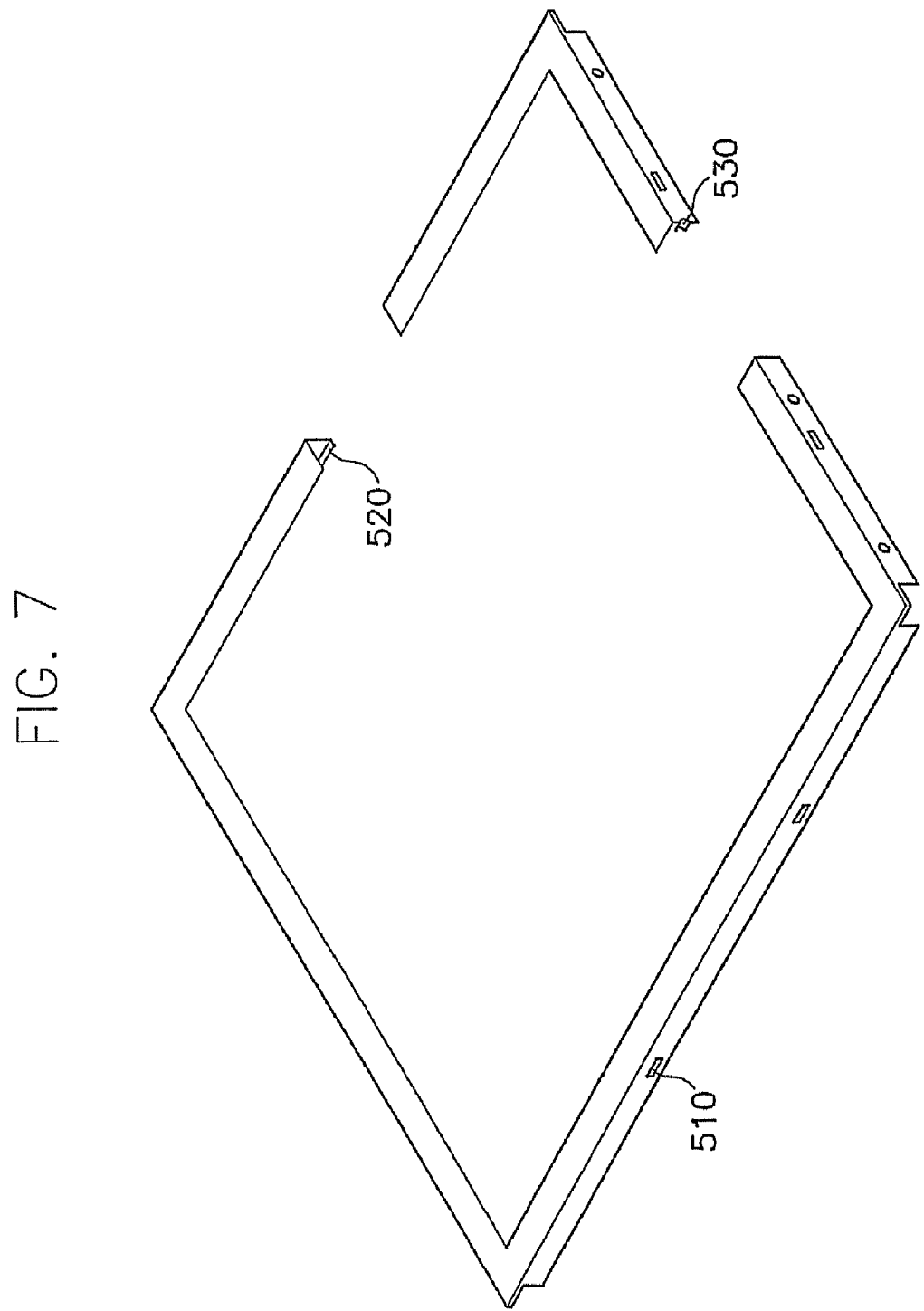
FIG. 7 is a partially cut perspective view showing a structure of a second chassis shown in FIG. 1.

FIG. 7 is a partially cut perspective view showing a structure of the second chassis shown in FIG. 1.

Referring to FIGS. 1 and 7, the second chassis 500 is disposed to press edge portions of the LCD panel 400 and is outwardly combined to the first to fourth sidewalls 120, 130, 140 and 150 of the receiving container 100 (referring to FIG. 2).

Referring again to FIG. 1, as an exemplary embodiment of the present invention, the receiving container 100, first chassis 300 and second chassis 500 are manufactured by pressing plates having a first thickness, a second thickness and a third thickness, respectively. The first thickness, second thickness and third thickness each are, for example, from about 0.1 mm to about 0.5 mm.

The receiving container 100, first chassis 300 and second chassis 500 are, for example, made of metal material. Thus, although the receiving container 100, first chassis 300 and second chassis 500 have the thickness of about 0.1 mm to about 0.5 mm, they may have strength enough to endure an externally applied impact. Also, the receiving container 100, first chassis 300 and second chassis 500 may be made of metal material such as aluminum or aluminum alloy, so that the LCD apparatus 1100 may have the strength while the entire thickness thereof is reduced.

In case that a receiving container and a first chassis are made of synthetic resin, the receiving container and first chassis each have a thickness in the range of 0.4 mm to 1.2~1.5 mm. In contrast, since the receiving container 100 and first chassis 300 are made of the metal material in the present invention, the receiving container 100 and first chassis 300 may have the thickness of about 0.1 mm to about 0.5 mm. That is, in the LCD apparatus 1100 the thickness of each of the receiving container 100 and first chassis 300 may be reduced by about 0.3 mm to about 0.7~1.0 mm, so that the entire thickness of the LCD apparatus 1100 is reduced by about 0.6 mm to about 2 mm.

In order to further reduce the thickness of the LCD apparatus 1100, the second thickness of the first chassis 300 may be thinner than the first thickness of the receiving container 100 and the third thickness of the second chassis 500. For example, the first thickness of the receiving container 100 is in the range of about 0.2 mm to about 0.5 mm, the third thickness of the second chassis 500 is in the range of about 0.2 mm to about 0.5 mm, and the second thickness of the first chassis 300 is in the range of about 0.1 mm to about 0.2 mm. This is because the first chassis 300 is little subject to an external force or an external impact in comparison with the receiving container 100 and the second chassis 500.

As another exemplary embodiment, the first chassis 300 may be formed to have a second thickness in the range of about 0.4 mm to about 1.5 mm using the synthetic resin, and the receiving container 100 and second chassis 500 is formed to have a first and a second thickness in the range of about 0.1 mm to about 0.5 mm using the metal material, respectively. In this case, the entire thickness of the LCD apparatus 1100 is reduced in comparison with the case that the receiving container 100, first chassis 300 and second chassis 500 are made of the synthetic resin.

The LCD apparatus 1100 needs light to display images thereon.

Figure 8C:
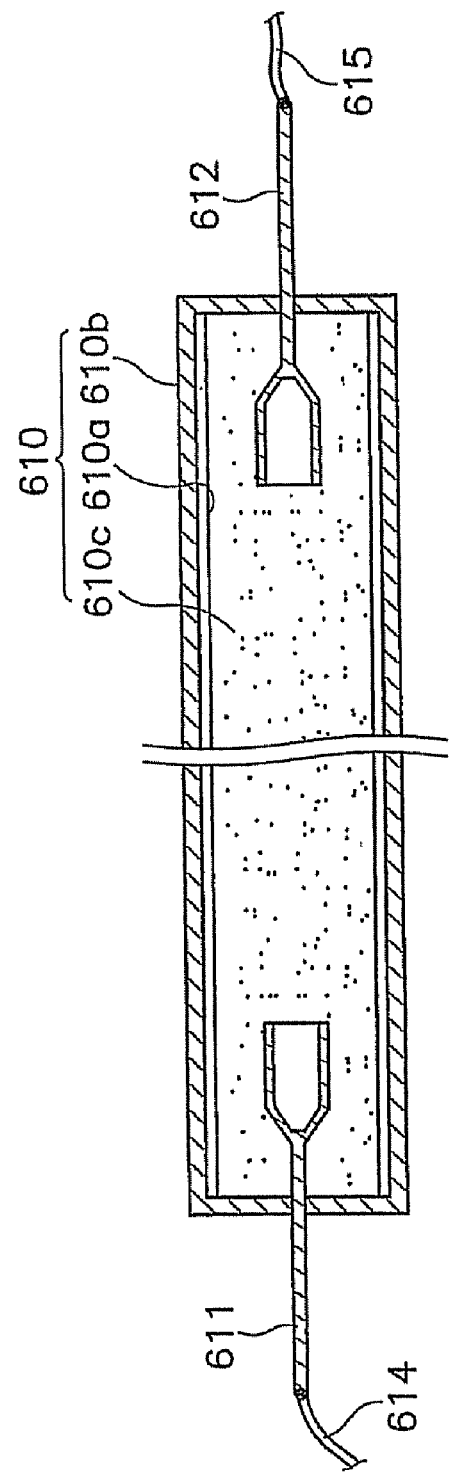
FIG. 8C is a cross-sectional view showing an internal structure of the lamp shown in FIG. 8A.

FIG. 8A is a perspective view showing a structure of a lamp shown in FIG. 1. FIG. 8B is a schematic view showing the lamp assembled with the receiving container shown in FIG. 1. FIG. 8C is a cross-sectional view of the lamp shown in FIG. 8A.

Referring to FIGS. 8A to 8C, the lamp 600 includes a lamp tube 610, first and second electrodes 611 and 612 and first and second lamp wires 614 and 615.

The lamp tube 610 has an L shape and includes a transparent tube 610a, a fluorescent material 610b deposited on an inner wall of the tube 610a and a discharge gas 610c injected inside the tube 610a.

The first and second electrodes 611 and 612 are disposed at opposite end portions, respectively, inside the tube 610a. The first and second electrodes 611 and 612 receive a discharge voltage applied through the first and second lamp wires 614 and 615.

The first and second lamp wires 614 and 615 are connected to the first and second electrodes 611 and 612, respectively. The first and second lamp wires 614 and 615 provide the discharge voltage generated from an external power supply device (not shown) to the first and second electrodes 611 and 612. The LCD apparatus 1100 may further include another lamp such as the lamp 600, so that there are two lamps between the first to fourth side surfaces 220, 230, 240 and 250 of the light guide plate 200 and the first to fourth sidewalls 120, 130, 140 and 150 of the receiving container 100 (referring to FIGS. 2 and 3). The lamp 600 is provided with a lamp holder 620 disposed at a bending portion thereof to fix the lamp 600 to the receiving container 100 and prevent the lamp 600 from being damaged. The first lamp wire 614, generally, has a length longer than that of the second lamp wire 615 to which a low voltage of the discharge voltage is applied.

Figure 9:
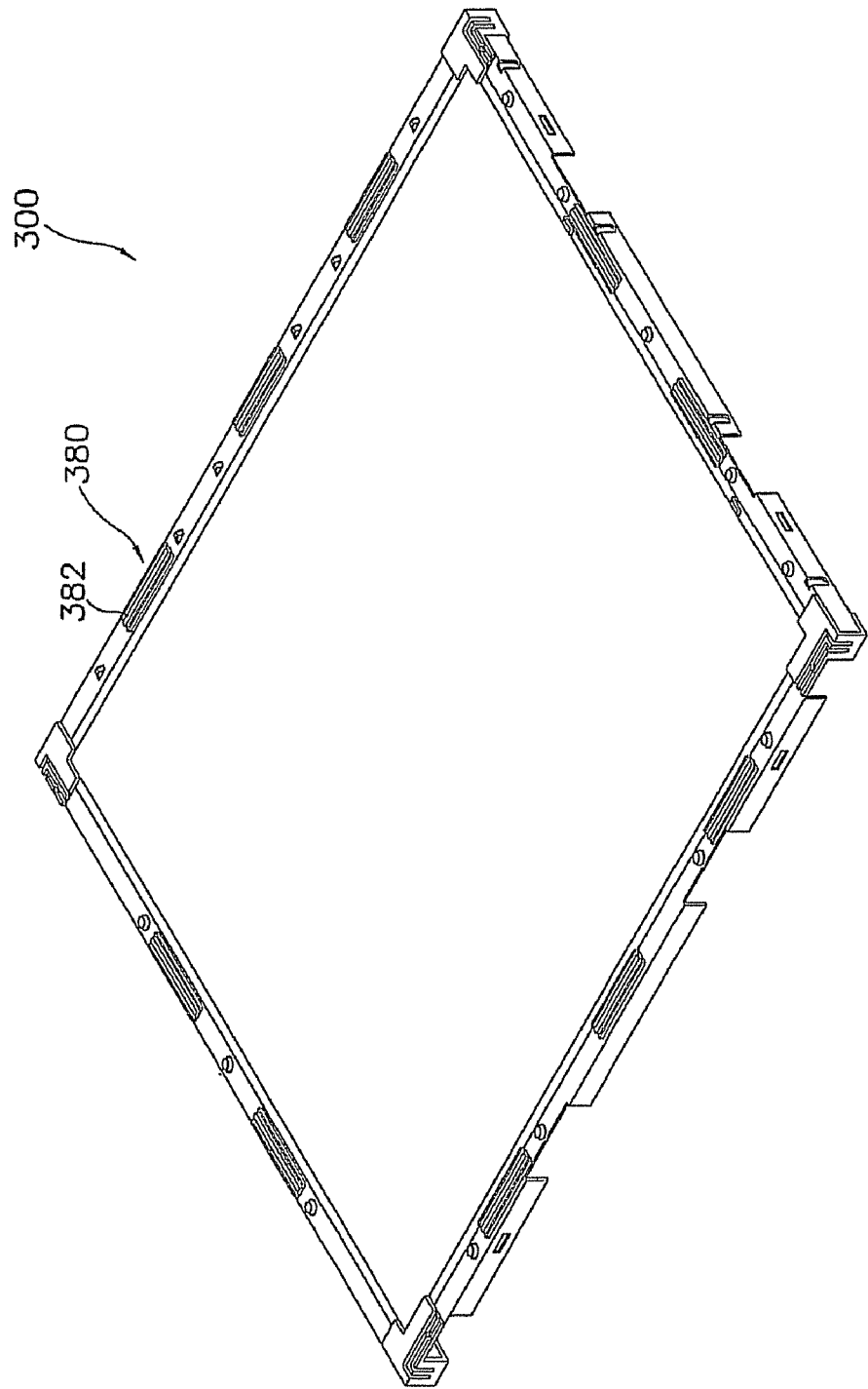
FIG. 9 is a perspective view showing a structure of a first chassis shown in FIG. 1.

FIG. 9 is a perspective view showing a structure of a first chassis having a lamp wire receiving member according to the present invention.

Referring to FIG. 9, the first chassis 300 is provided with a lamp wire receiving member 380 for fixing the first lamp wire 614 to a predetermined position. The lamp wire receiving member 380 is disposed on the first chassis 300 in such a manner as not to interfere with the LCD panel assembly 400 disposed on the first chassis 300.

The lamp wire receiving member 380 may be made of, for example, synthetic resin. The lamp wire receiving member 380 includes a lamp wire receiving groove 382 disposed thereof. The lamp wire receiving groove 382 is formed in a direction parallel to a direction that guides the first lamp wire 614.

Figure 10:
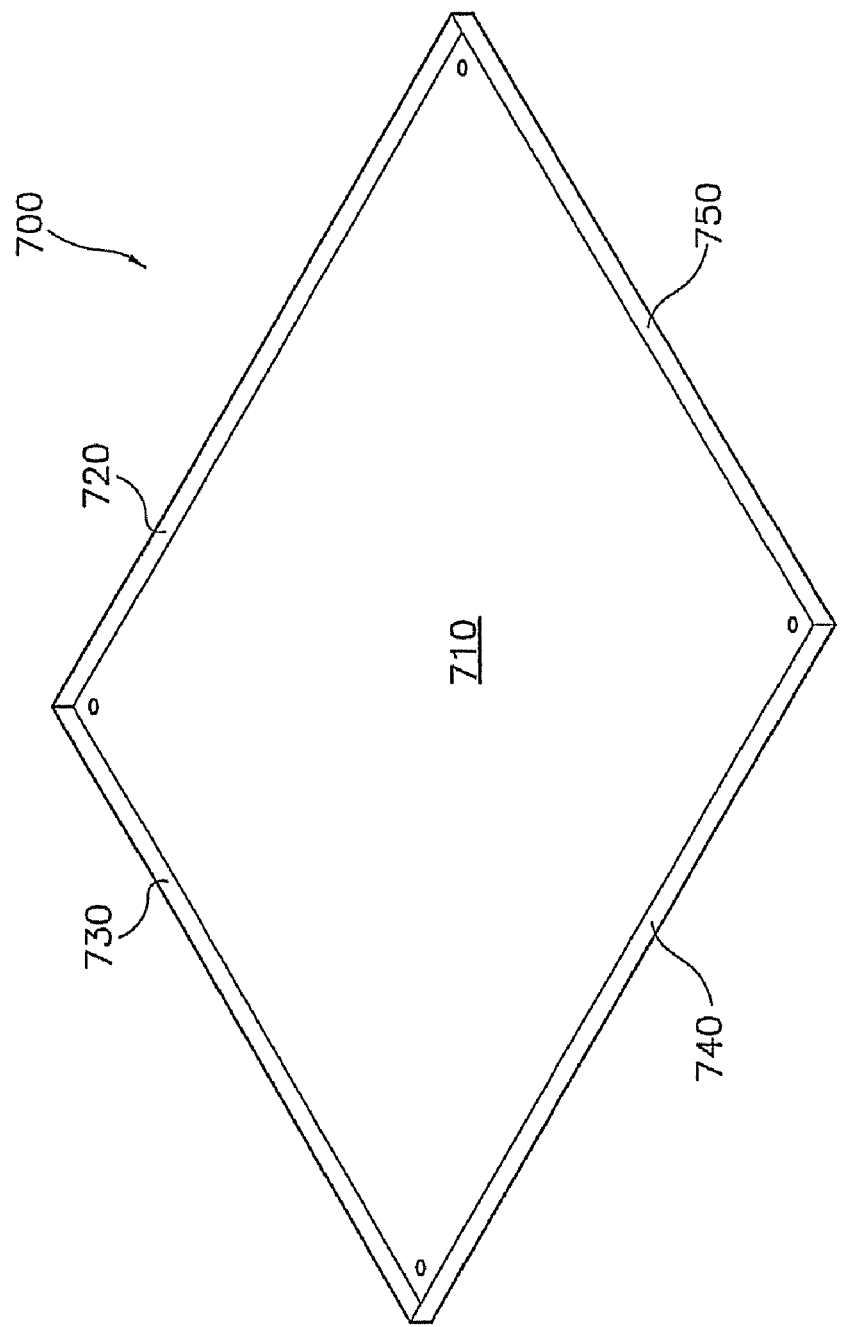
FIG. 10 is a perspective view showing a structure of a reflecting plate shown in FIG. 1.

FIG. 10 is a perspective view showing a structure of a reflecting plate shown in FIG. 1.

Referring to FIGS. 1 and 10, a reflecting plate 700 includes a first reflecting surface 710 and first to fourth side reflecting surfaces 720, 730, 740 and 750. The reflecting plate 700 may be made of, for example, synthetic resin.

The first reflecting surface 710 is disposed between the bottom surface 110 of the receiving container 100 and the light reflecting surface 260 of the light guide plate 200. The first reflecting surface 710 reflects the light leaked from the light guide plate 200 through the light reflecting surface 260 to the light guide plate 200.

The first to fourth side reflecting surfaces 720, 730, 740 and 750 are respectively disposed between the first to fourth sidewalls 120, 130, 140 and 150 of the receiving container 100 and the lamp 600. The first to fourth side reflecting surfaces 720, 730, 740 and 750 reflect the light emitted from the lamp 600 to the first to fourth side surfaces 220, 230, 240 and 250 of the light guide plate 200, respectively. That is, the first to fourth side reflecting surfaces 720, 730, 740 and 750 of the reflecting plate 700 perform a role of a lamp reflector.

As an exemplary embodiment, the first reflecting surface 710 and the first to fourth side reflecting surfaces 720, 730, 740 and 750 are disposed separately. In other words, the first reflecting surface 710 is adhered to the bottom surface 110 of the receiving container 100, and the first to fourth side reflecting surfaces 720, 730, 740 and 750 are adhered to the first to fourth sidewalls 120, 130, 140 and 150, respectively, of the receiving container 100.

In the present invention, the reflecting plate may be removed because the receiving container 100 and the first chassis 300 are made of metal material having a high light reflectance.

Figure 11:
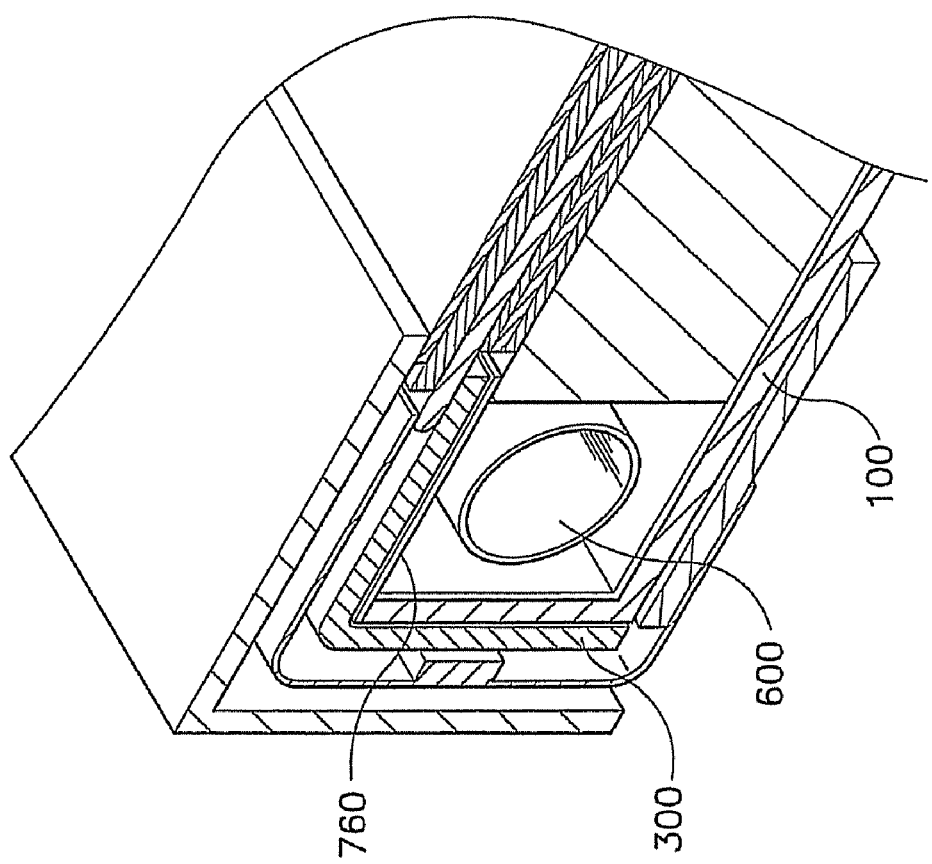
FIG. 11 is a schematic view showing a structure of another reflecting plate according to the present invention.

FIG. 11 is a schematic view showing a structure of a reflecting plate according to another embodiment of the present invention.

Referring to FIG. 11, the first chassis 300 is provided with a separated reflecting plate 760. The separated reflecting plate 760 is disposed under the first chassis 300 to cover an upper portion of the lamp 600, thereby increasing the light efficiency.

Figure 12:
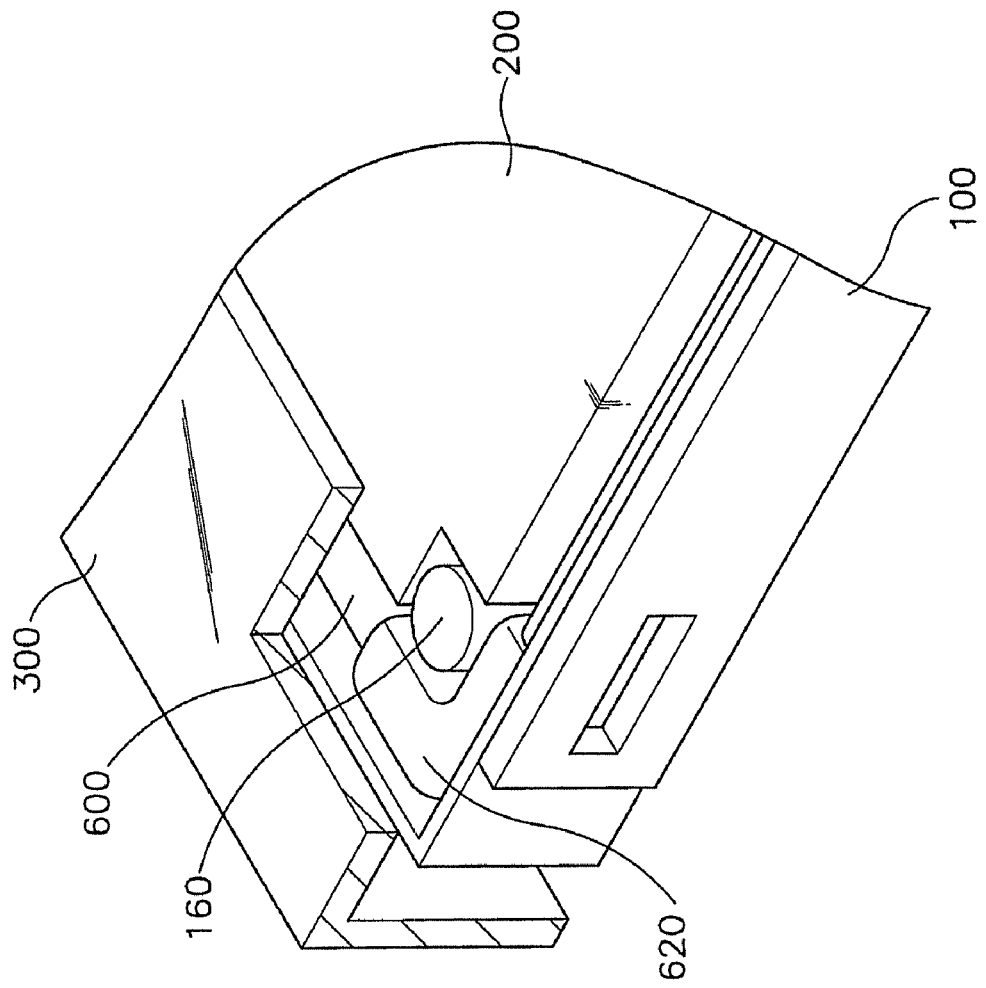
FIG. 12 is a partially enlarged view of the receiving container shown in FIG. 1.

FIG. 12 is a partially enlarged view of the receiving container shown in FIGS. 1 and 2.

Referring to FIG. 12, the receiving container 100 further includes a fixing boss 160 disposed on the bottom surface 110. The fixing boss 160 prevents the light guide plate 200 and lamp 600 from being moved in the receiving container 100. For example, the fixing boss 160 is disposed at each corner portion of the receiving container 100. In this case, since the bottom surface 110 of the receiving container 100 has four corner portions, four fixing bosses are disposed on the four corner portions, respectively.

The lamp holder 620 is inserted between the fixing boss 160 and the receiving container 100, and the light guide plate 200 is disposed inwardly with respect to the four fixing bosses in the receiving container 100. The light guide plate 200 is provided with an engaging portion 265. The engaging portion 265 is formed by cutting four corner portions of the light guide plate 200, respectively. The engaging portion 265 is engaged to the fixing boss 160, so that the light guide plate 200 is fixed to the receiving container 100.

Figure 13:
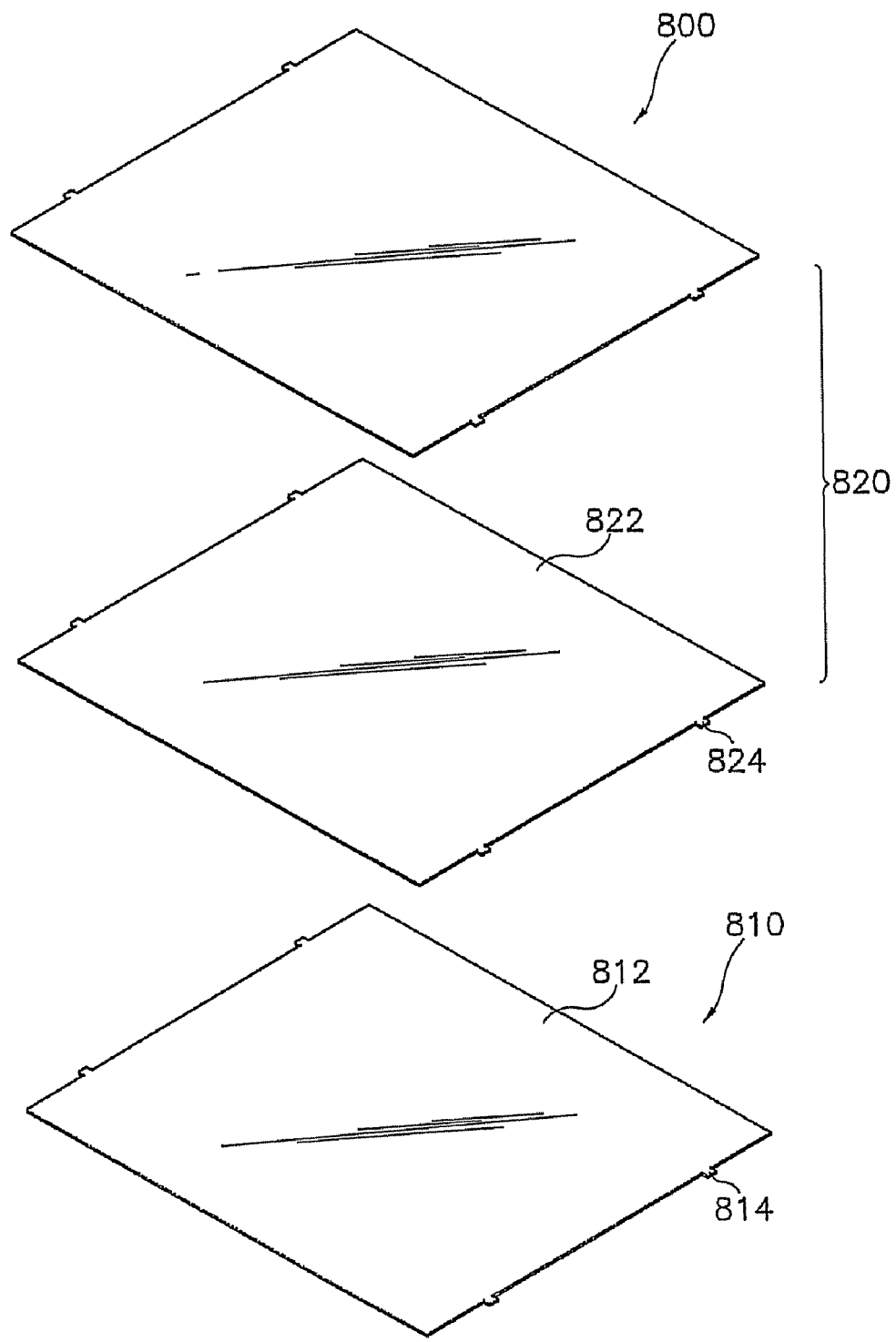
FIG. 13 is a perspective view showing a structure of optical sheets shown in FIG. 1.

FIG. 13 is a perspective view showing a structure of optical sheets shown in FIG. 1.

Referring to FIGS. 1 and 13, the optical sheets 800 are disposed on the light emitting surface 270 of the light guide plate 200. The optical sheets 800 include a diffusing sheet 810 having a diffusing sheet body 812 and a diffusing sheet engaging protrusion 814 and a prism sheet 820 having a prism sheet body 822 and a prism sheet engaging protrusion 824. In the present invention, as an exemplary embodiment, the optical sheets 800 include two prism sheets.

The diffusing sheet body 812 diffuses the light emitted from the light emitting surface 270 to increase uniformity of the brightness thereof. The diffusing sheet engaging protrusion 814 is extended from a selected portion at an edge of the diffusing sheet body 812 and serves to prevent the diffusion sheet body 812 from being moved. For example, the diffusing sheet body 812 has four diffusing sheet engaging protrusions formed at the opposite edges of the diffusing sheet body 812, as shown in FIG. 13.

The prism sheet body 822 is disposed facing to the diffusing sheet body 812. The prism sheet body 822 has a prism shape to reset the direction of the light diffused by the diffusing sheet 810. The prism sheet engaging protrusion 824 is extended from a selected portion at an edge of the prism sheet body 822 and serves to prevent the prism sheet body 822 from being moved. As shown in FIG. 13, the prism sheet body 822 may have four prism sheet engaging protrusions formed at the opposite edges of the prism sheet body 822. The prism sheet engaging protrusion 824, generally, is provided corresponding to the diffusing sheet engaging protrusion 814.

Figure 14:
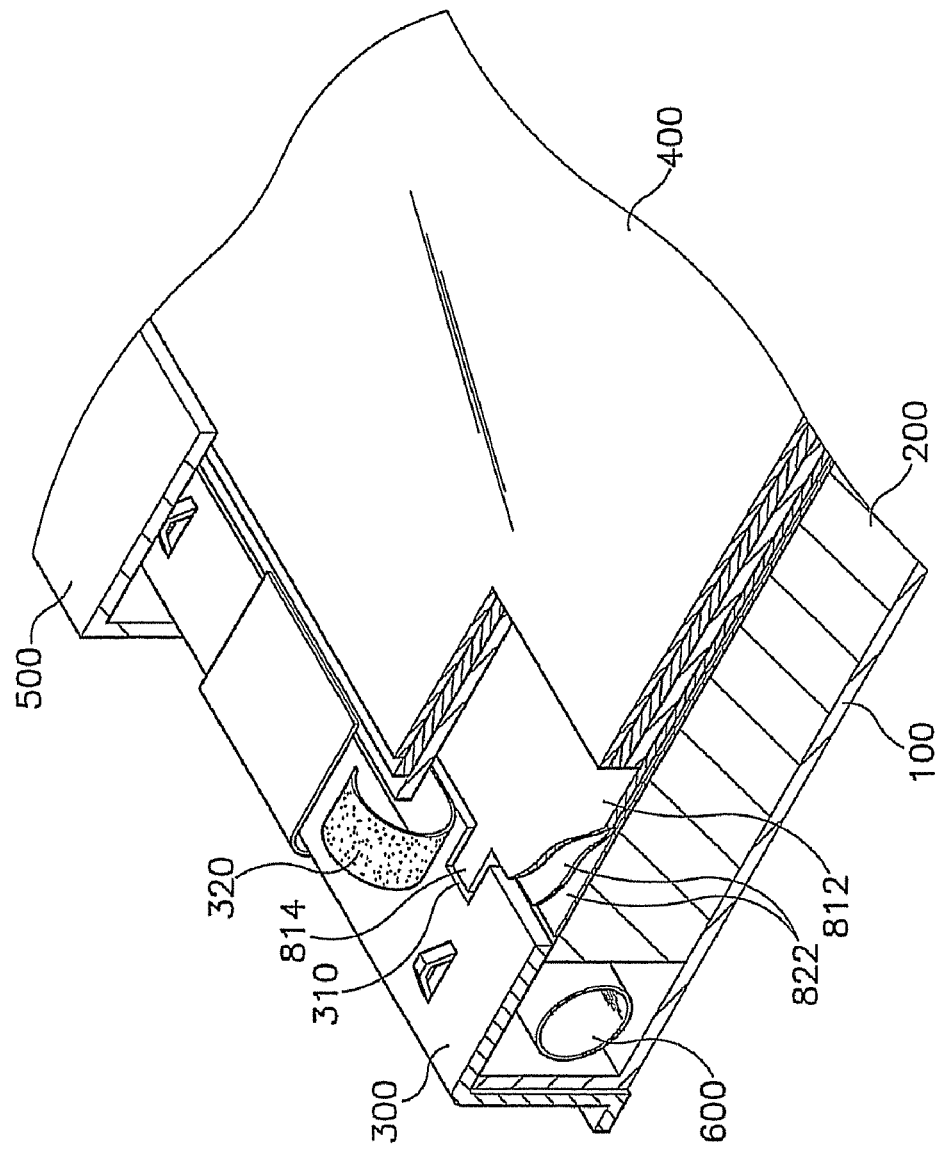
FIG. 14 is a schematic view showing an assembled structure of the optical sheets and the first chassis.

FIG. 14 is a schematic view showing an assembled structure of the optical sheets and the first chassis.

Referring to FIG. 14, the diffusing sheet engaging protrusion 814 and the prism sheet engaging protrusion 824 are fixed to the first chassis 300. The first chassis 300 is provided with an engaging recess 310 corresponding to the diffusing sheet engaging protrusion 814 and the prism sheet engaging protrusion 824. The first chassis 300 is further provided with a fixing member 320 for fixing the diffusing sheet 810 and the prism sheet 820 to the first chassis 300. The fixing member 320 is disposed on the first chassis 300 to cover the diffusing sheet engaging protrusion 814 and the prism sheet engaging protrusion 824 inserted into the engaging recess 310, so that the diffusing sheet engaging protrusion 814 and the prism sheet engaging protrusion 824 are not deviated from the engaging recess 310. For example, the fixing member 320 is a band strip having an adhesive bottom surface.

Figure 15:
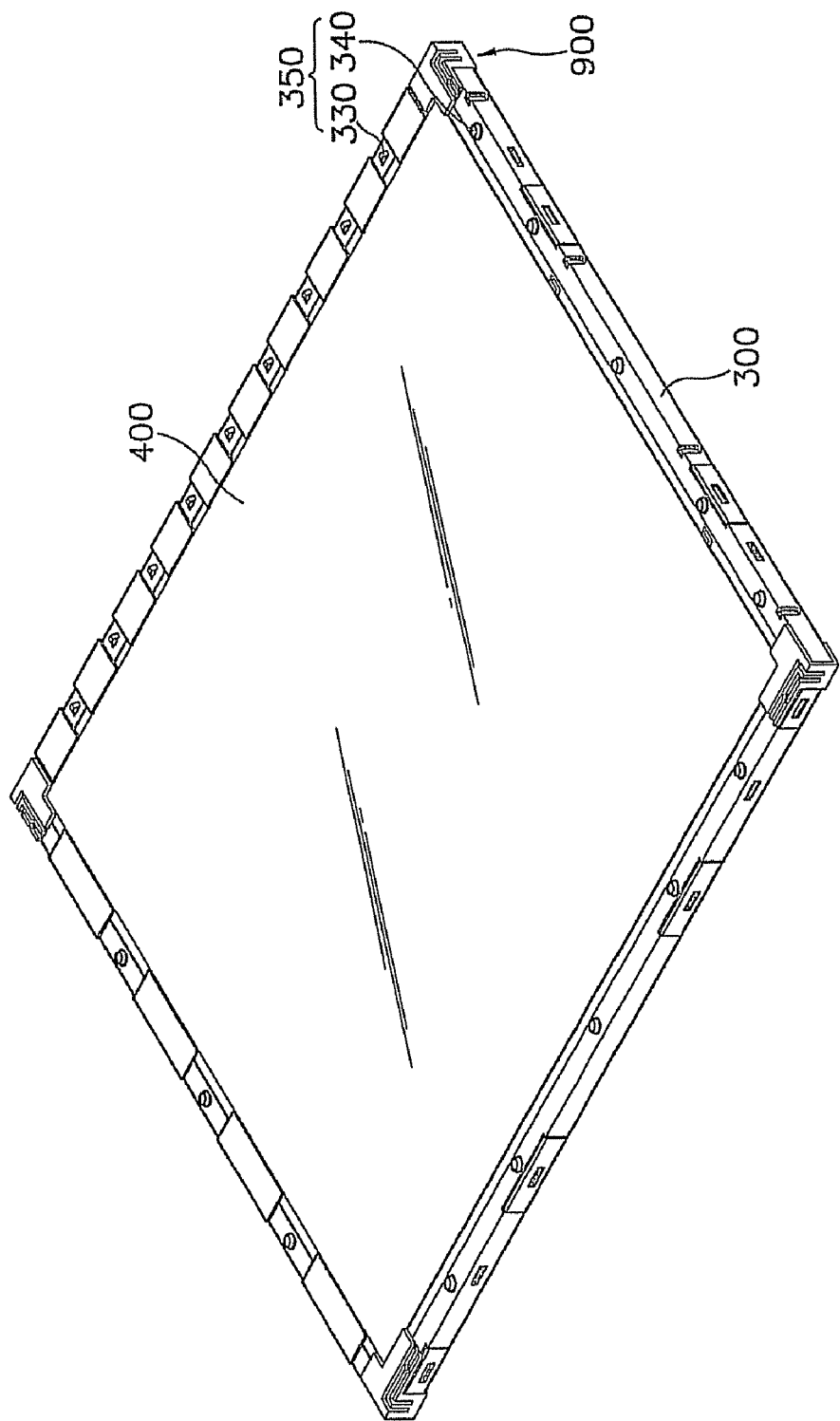
FIG. 15 is a perspective view showing a guide member of an LCD panel according to the present invention.

FIG. 15 is a perspective view showing a guide member of an LCD panel according to the present invention.

Referring to FIG. 15, the LCD panel assembly 400 is disposed on the first chassis 300 and fixed to the first chassis 300 by the second chassis 200 that is combined to the receiving container 100. In case of receiving an impact or damage onto the LCD apparatus 1100, the LCD panel assembly 400 may be moved. In order to prevent the LCD panel assembly 400 from being moved, the first chassis 300 may further include a guide member 900. For example, the guide member 900 is disposed at each corner portion of the first chassis 300 to guide the corner portions of the LCD panel assembly 400.

Figure 16:
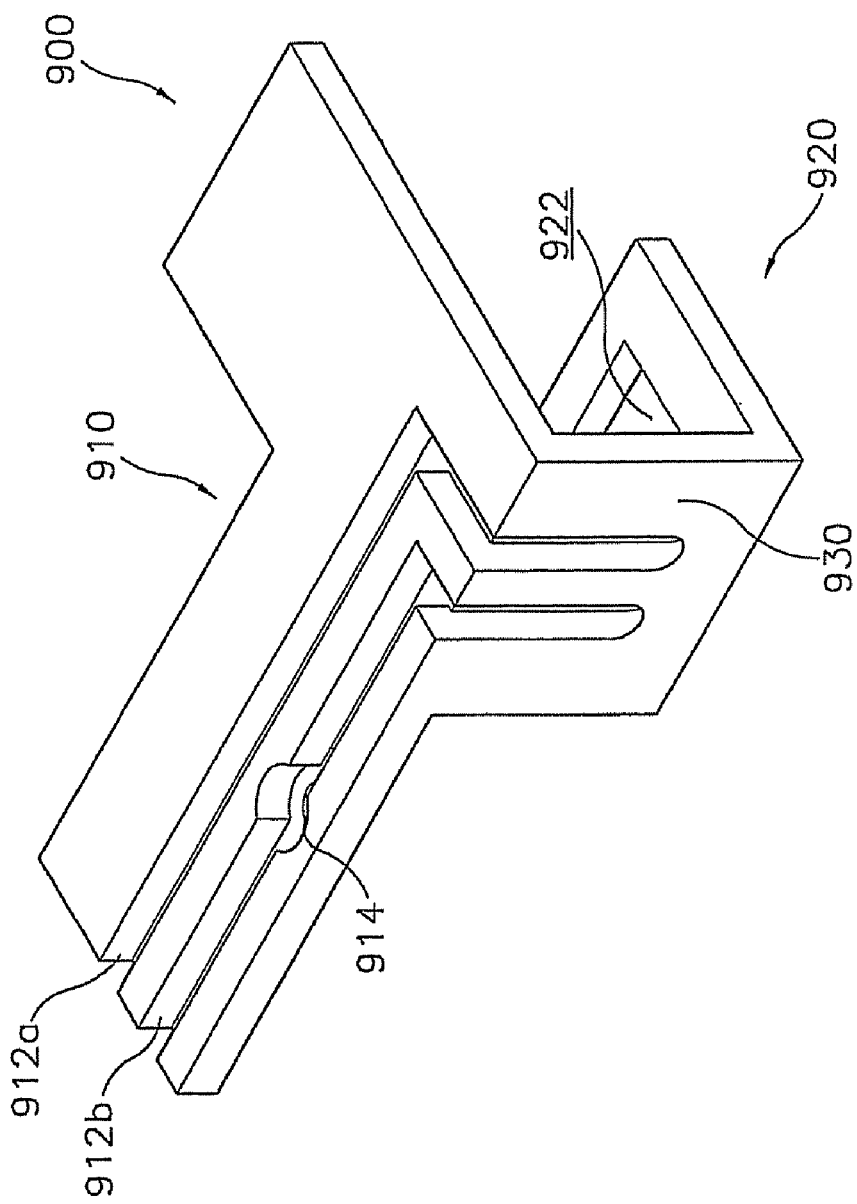
FIG. 16 is a perspective view showing a structure of the guide member shown in FIG. 15.

FIG. 16 is a perspective view showing a structure of the guide member shown in FIG. 15.

Referring to FIG. 16, the guide member 900 includes a first guide body 910, a second guide body 920 and a connection body 930.

The first guide body 910 having an L shape. The first guide body 910 is provided with a first receiving groove 912a and a second receiving groove 912b for receiving the first and second lamp wires 614 and 615 of the lamp 600, respectively. The second receiving groove 912 b is provided with a first engaging portion 914. The second guide body 920 is provided with a second engaging portion 922. The first engaging portion 914 is, for example, a screw engaging hole for engaging a screw to fix the first guide body 910 onto the first chassis 300.

The connection body 930 is connected with the first and second guide bodies 910 and 920. The connection body 930 has a length appropriate to allow the first and second guide bodies 910 and 920 to press the first chassis 300 and the rear surface of the receiving container 100, respectively.

FIG. 17 is a schematic view showing an assembled structure of the guide member and the receiving container.

Referring to FIG. 17, in order to prevent the guide member 900 from being deviated from the receiving container 100, a portion of the bottom surface 110 of the receiving container 100 corresponding to the second guide body 920 is partially cut and is engaged into the second engaging portion 922.

Referring to FIGS. 4 and 15, the first chassis 300 further includes a supporting portion 350 to support the second chassis 500. The supporting portion 350 is formed by partially protruding or cutting a portion on the first chassis 300 toward the second chassis 500.

The supporting portion 350 includes a first supporting portion 330 and a second supporting portion 340 having shapes different to each other. For example, the first supporting portion 330 is formed by partially cutting the first chassis 300 and bending the cut portion in a triangle shape and is disposed between the TCPs 494. The second supporting portion 340 is disposed on another portion of the first chassis 300, where the first supporting portion 330 is not disposed. The second supporting portion 340 is formed by partially pressing the first chassis 300 toward the second chassis 500. The second supporting portion 340 may have a surface area larger than that of the first supporting portion 330.

Hereinafter, an assembled structure of the receiving container 100, first chassis 300 and second chassis 500 will be described.

Referring to FIGS. 2 and 4, the first to fourth sidewalls 120, 130, 140 and 150 of the receiving container 100 are provided with a first engaging hole 170, and the first chassis 300 is provided with a first combining portion 360 corresponding to the first engaging hole 170.

Figure 18B:
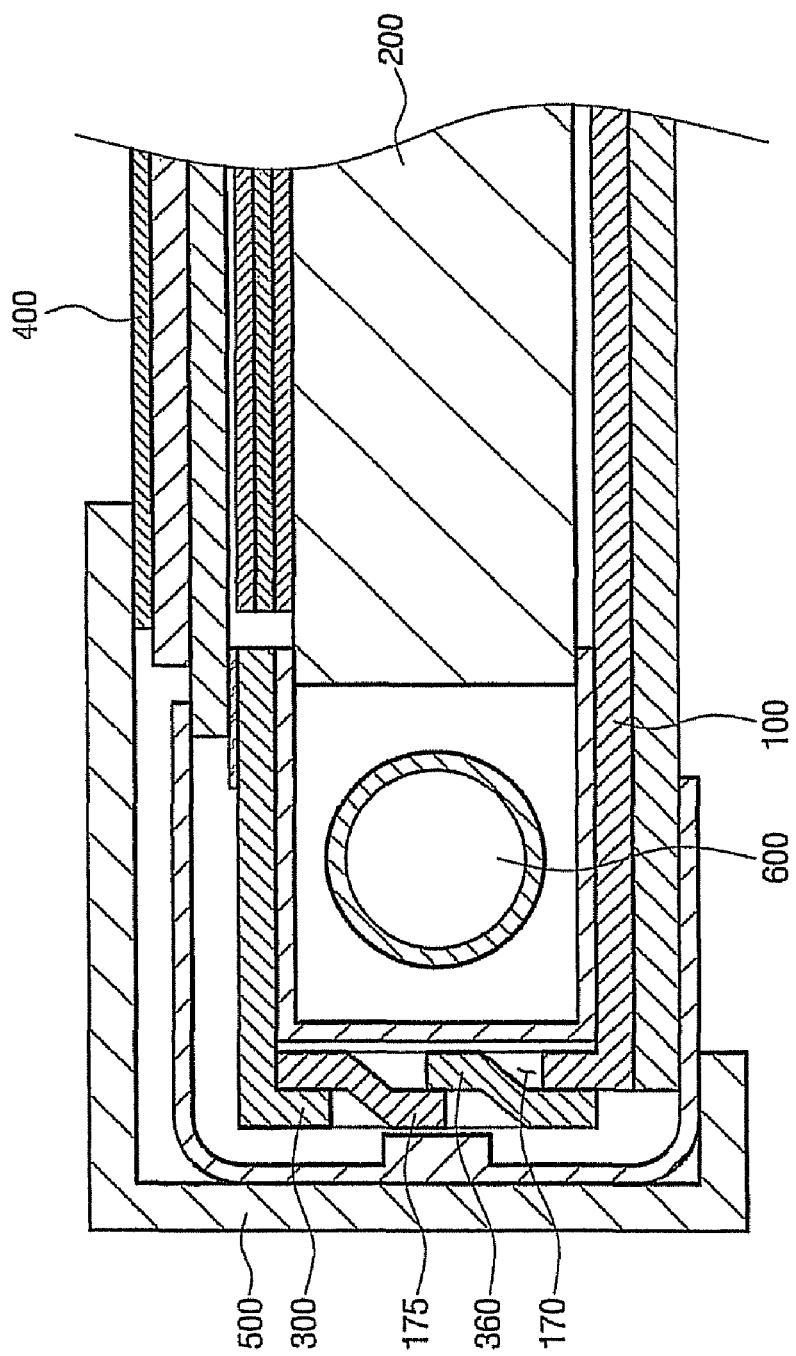

FIGS. 18A and 18B are schematic views showing an assembled structure of the receiving container 100 and the first chassis 300.

Referring to FIGS. 18A and 18B, each sidewall of the receiving container 100 has an engaging portion 175 at the position of the first engaging hole 170. In the engaging portion 175, the side and bottom edges are cut and the top edge is bent to be protruded outward with respect to the receiving space. The first chassis 300 has the first combining portion 360 of which side and top edges are cut and bottom edge is bent to be protruded inward with respect to the receiving space. Thus, the engaging portion 175 and the first combining portion 360 are engaged to each other at the time of combining the receiving container 100 and the first chassis 300 together.

Referring again to FIG. 2, the receiving container 100 may further include a second combining portion 180 separated from the first engaging hole 170 in a predetermined distance. The second combining portion 180 is outwardly protruded after cutting a portion of the first and third sidewalls 120 and 140. The thickness of the protruded portion of the second combining portion 180 is identical to that of the first chassis 300 combined to the receiving container 100, so that the second combining portion 180 and the first chassis are disposed on a same planar level. The second combining portion 180 is provided with a second engaging hole 185. Also, a portion facing the second combining portion 180 of the first chassis 300 is open to expose the second combining portion 180 and combine the second combining portion 180 to the second chassis 500.

Referring again to FIG. 7, the second chassis 500 may further include a third combining portion 510. The third combining portion 510 of the second chassis 500 is combined to the second engaging hole 185 of the receiving container 100 and formed by cutting a selected portion of the second chassis 500 and inwardly bending the cut portion.

Referring to FIG. 19, the receiving container 100 is provided with a second chassis engaging protrusion 190 disposed on a portion that the bottom surface 110 is in contact with first, second, third or fourth sidewalls 120, 130, 140 and 150. The second chassis engaging protrusion 190 makes the second chassis 500 to be strongly combined to the receiving container 100.

Referring to FIGS. 7 and 19, the second chassis 500 may further include an engaging surface 520 engaged to the second chassis engaging protrusion 190. When the second chassis 500 is assembled after engaging the engaging surface 520 of the second chassis 500 to the second chassis engaging protrusion 190, the third combining portion 510 facing the second chassis engaging protrusion 190 of the second chassis 500 is engaged to the second engaging hole 185 of the receiving container 100.

In another aspect, the receiving container 100 may be formed to have another structure.

Figure 20:
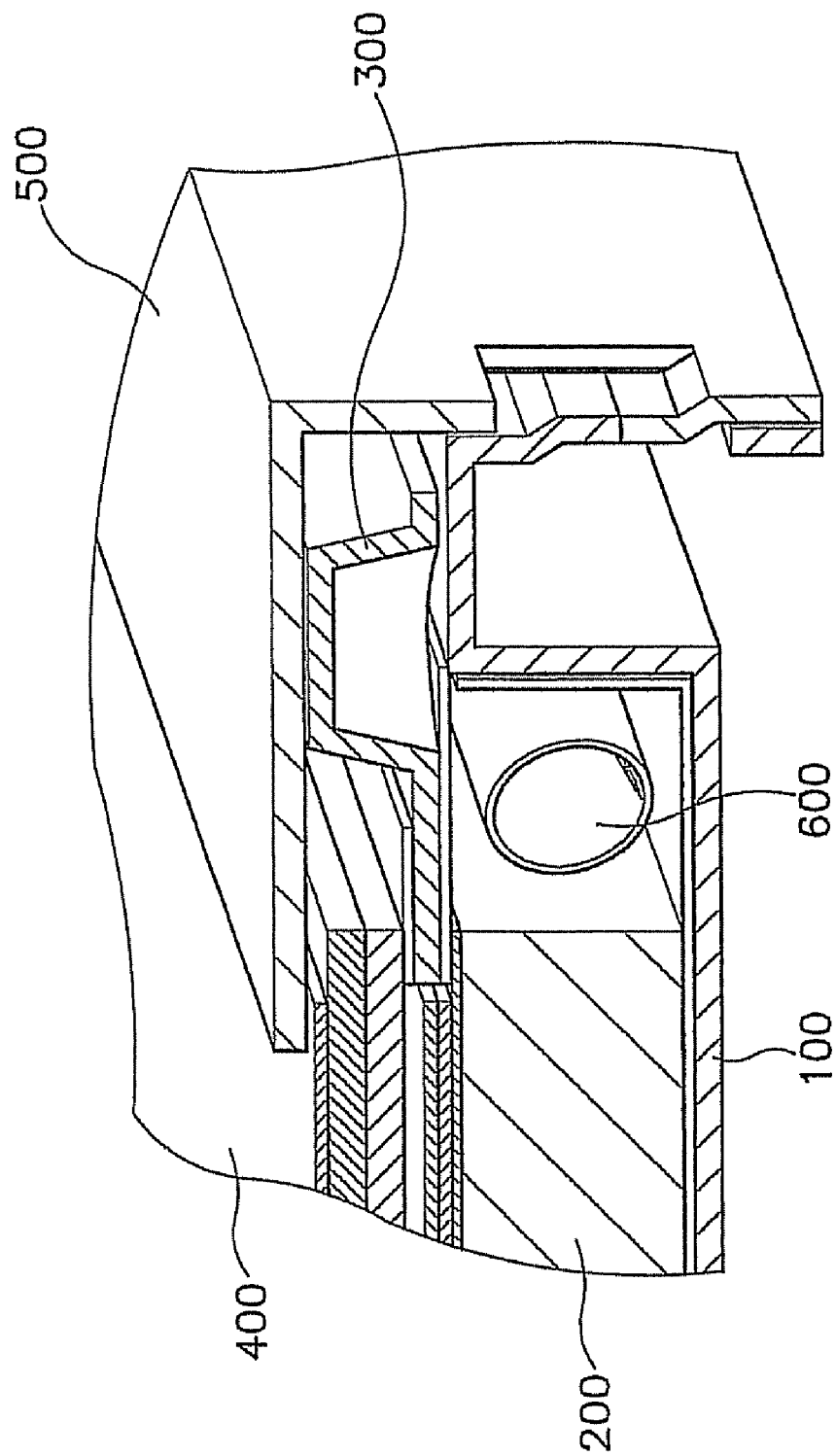

Referring to FIGS. 2 and 20, the first to fourth sidewalls 120, 130, 140 and 150 are extended from edge portions of the bottom surface 110 of the receiving container 100. The second and fourth sidewalls 130 and 150 facing to each other are outwardly extended in a direction parallel to the bottom surface 110. The extended portions of the second and fourth sidewalls 130 and 150 are bent to a direction perpendicular to the bottom surface 110 and extended in a predetermined length.

Accordingly, the receiving container 100 may provide the receiving space on the bottom surface 100 and simultaneously provide engaging spaces 155 disposed adjacent to the second and fourth sidewalls 130 and 150, respectively. The second and fourth sidewalls 130 and 150 are provided with a first combining hole 158, and the first chassis 300 is provided with a second combining hole 370 corresponding to the first combining hole 158 as shown in FIGS. 2 and 4. Also, the second chassis 500 may include a tapping portion 530 inserted into the first and second combining holes 158 and 370 to cover inner surfaces of the first and second combining holes 158 as shown in FIG. 21.

According to the LCD apparatus, the receiving container for receiving the light guide plate and lamp assembly, the first chassis for fixing the light guide plate and LCD panel, and the second chassis for fixing the first chassis and LCD panel, are made of metal material. Thus, the LCD apparatus may have a reduced size (or thickness) and weight and readily emit heat generated from the lamp assembly.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An LCD apparatus comprising:
a light guide plate including a light reflecting surface, a light emitting surface opposite to the light reflecting surface and a side surface;
a first chassis including a sidewall and receiving the light guide plate, the first chassis being a vertically unitary and indivisible unit;
a second chassis disposed over the first chassis, a first portion of the second chassis making direct contact with the sidewall of the first chassis, the second chassis being a vertically unitary and indivisible unit and including a metal;
an LCD panel assembly disposed over the first chassis and facing the light emitting surface, the LCD panel assembly being guided by a guide member of the second chassis to be fixed to the first chassis; and
a third chassis disposed over the first chassis, pressing an edge portion of the LCD panel assembly, outwardly combined with the side wall of the first chassis and the second chassis, and making direct contact with both a second portion of the second chassis and the sidewall of the first chassis.

2. The LCD apparatus of claim 1, wherein the light guide plate is disposed between the first chassis and the second chassis.

3. The LCD apparatus of claim 1, wherein the second chassis presses an edge portion of the light emitting surface.

4. The LCD apparatus of claim 3, wherein the second portion of the second chassis is near the first portion of the second chassis.

5. The LCD apparatus of claim 1, wherein the third chassis makes direct contact with an upper surface of the sidewall of the first chassis.

6. The LCD apparatus of claim 5, wherein the third chassis makes direct contact with an outer surface of the sidewall of the first chassis.

7. The LCD apparatus of claim 1, wherein the guide member guides each of four corner portions of the LCD panel assembly.

8. The LCD apparatus of claim 7, wherein the guide member includes a plastic-based material.

* * * * *